(12) United States Patent  
Miyagawa et al.

(10) Patent No.: US 7,636,194 B2
(45) Date of Patent: Dec. 22, 2009

(54) PORTABLE SCREEN ASSEMBLY

(75) Inventors: Yukio Miyagawa, Chuo-ku (JP); Teruyuki Abe, Chuo-ku (JP); Kazuharu Seki, Setagaya-ku (JP)

(73) Assignee: Izumi-Cosmo Company, Limited, Osaka (JP)

( * ) Notice: Subject to any disclaimer, the term of this patent is extended or adjusted under 35 U.S.C. 154(b) by 0 days.

(21) Appl. No.: 12/153,255

(22) Filed: May 15, 2008

(65) Prior Publication Data

US 2008/0247041 A1 Oct. 9, 2008

Related U.S. Application Data

(62) Division of application No. 10/577,228, filed as application No. PCT/JP2004/005765 on Apr. 22, 2004, now Pat. No. 7,440,187.

(30) Foreign Application Priority Data

Oct. 31, 2003 (JP) ............................. 2003-372909

(51) Int. Cl.
G03B 21/56 (2006.01)
(52) U.S. Cl. ...................... 359/443; 359/461
(58) Field of Classification Search ................ 359/461, 359/443; 396/3; 248/685
See application file for complete search history.

(56) References Cited

U.S. PATENT DOCUMENTS

| 1,897,273 | A | 2/1933 | Nagel | |
|---|---|---|---|---|
| 1,917,369 | A | 7/1933 | Heck | |
| 2,534,552 | A | 12/1950 | Heck et al. | |
| 5,296,964 | A | 3/1994 | Shopp | |
| 5,581,401 | A | 12/1996 | Takamoto et al. | |
| 5,798,861 | A | 8/1998 | Doat | 359/461 |
| 6,052,227 | A | 4/2000 | Niwa et al. | 359/461 |
| 6,249,377 | B1 | 6/2001 | Takamoto et al. | |
| 6,336,616 | B1 | 1/2002 | Lin | |

FOREIGN PATENT DOCUMENTS

| DE | 197 07 516 | 9/1998 |
|---|---|---|
| GB | 2 076 179 | 11/1981 |

(Continued)

OTHER PUBLICATIONS

Supplementary European Search Report (in English language) issued Nov. 5, 2008 in European Application No. C4728911.1.

(Continued)

*Primary Examiner*—Christopher Mahoney
(74) *Attorney, Agent, or Firm*—Wenderoth, Lind & Ponack, L.L.P.

(57) ABSTRACT

A portable screen assembly includes: a casing having an opening extending in a longitudinal direction on the upper surface thereof, and formed by a pair of separable case members that extend in the longitudinal direction; a spring-biased roll rotatably mounted in the casing; a screen wound around the spring-biased roll in a storage position and extended from the opening in use; a top bar fixed to one end of the screen which is used as a cover body to close the opening in the storage position; and an extendable column having one end erectably pivoted from a center part of a side face of the casing to hold the screen in a stretched state.

5 Claims, 25 Drawing Sheets

FOREIGN PATENT DOCUMENTS

| | | |
|---|---|---|
| JP | 5-94837 | 12/1993 |
| JP | 6-10944 | 2/1994 |
| JP | 6-26048 | 5/1994 |
| JP | 8-69057 | 3/1996 |
| JP | 3385207 | 12/2002 |

OTHER PUBLICATIONS

Notification of Transmittal of Duplicate of Demand for Patent Invalidation Trial for Japanese Patent No. 4157908 dated Apr. 28, 2009 (with English translation).

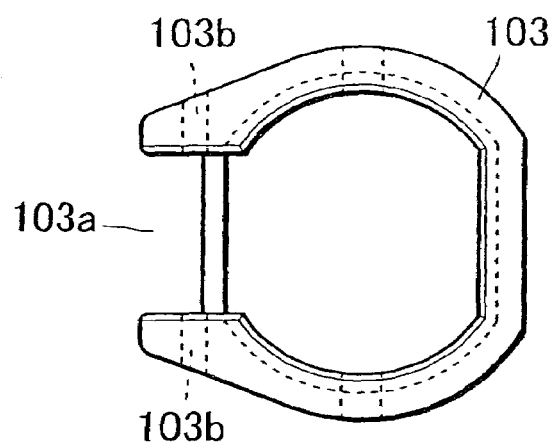
*Fig. 11A*
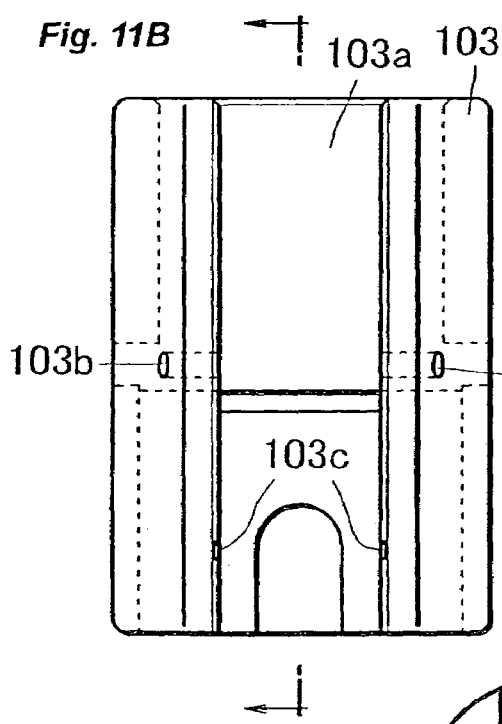
*Fig. 11B*
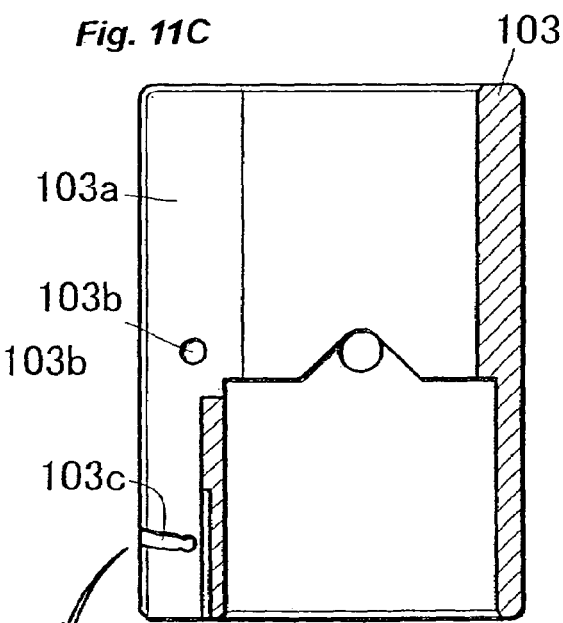
*Fig. 11C*
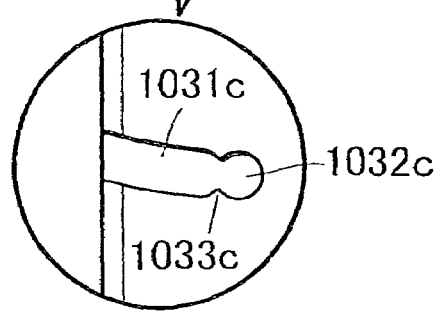

PORTABLE SCREEN ASSEMBLY

This is a divisional application of Ser. No. 10/577,228, filed Jun. 8, 2006 which is the National Stage of International Application No. PCT/JP2004/005765, filed Apr. 22, 2004, now U.S. Pat. No. 7,440,187.

BACKGROUND OF THE INVENTION

1. Field of the Invention

The present invention relates generally to a screen for displaying, on an enlarged scale, an image projected by a projecting device such as a projector, and in particular, but not exclusively, to a portable screen assembly that is easy to carry and can be installed on a floor, a table, or the like.

2. Description of the Related Art

An image projected by a projector or, in some cases, a projection TV set is generally displayed, on an enlarged scale, on a reflection type screen or on a transmission type screen. Of such screens, some are generally accommodated in a housing mounted on a ceiling or a side wall, and are electrically or manually extended as occasion demands. Hanging screens or screens with a tripod are used by hanging or locating at a desired place.

Recently, due to the increasing number of meetings or conferences in companies or offices, there is an increased demand for a portable screen assembly of a simple structure that is easy to carry with a projector which can be installed on a floor, a desk, or a table in a conference room to display an image projected by the projector. Due to this demand, portable screen assemblies are now available in which a screen is wound around a roll stored in a housing. When such screen assemblies are in use, the housing is initially installed at a desired place, and the screen is subsequently extended by, for example, an extension means somewhat similar to a pantograph by the action of the biasing force of a spring mounted therein, or the screen is fastened to a column attached to the housing (for example, refer to JP Laid-open Utility Model Publication No. 6-36048).

There is also an increasing demand for a portable screen assembly for in home use because of increased use of projectors for projecting a TV picture.

SUMMARY OF THE INVENTION

However, a portable screen assembly for home use must be small and light in weight so that it can be easily carried by a woman or a child. Further, a simple structure which can be easily stored in and pulled out from a housing is also required.

Further, conventional casings are integrally formed, thus, the spring-biased roll must be inserted into the casing from one side thereof. Therefore, the spring-biased roll may not be properly positioned, which tends to cause the spring-biased roll and the casing to be damaged when the spring-biased roll is inserted into the casing. Further, the casing must be thick in order to keep the mechanical integrity of the casing, and this causes a problem that the weight of the casing cannot be reduced.

SUMMARY OF THE INVENTION

The present invention was made in view of such requirements and problems, and is intended to provide a portable screen assembly with a simple construction which can be readily transported with a projector and is easy to handle.

In order to solve the above-described problem, a portable screen assembly of the present invention comprises a casing, having an opening extending in a longitudinal direction on the upper surface thereof, formed by first and second case members that extend in the longitudinal direction and are separate from each other; a spring-biased roll rotatably mounted to the casing; a screen wound around the spring-biased roll in a storage position, and pulled out from the opening when in use; a top bar secured to one end of the screen and used as a cover to close the opening in the storage position; and an extendable column, having one end supported at a center portion of a side face of the casing, for holding the screen in an extended state.

In addition, according to the portable screen assembly of the present invention, one end of the column may be erectably pivoted at the center portion of the side face of the casing so as to be capable of standing and holding the screen in the extended state.

Further, according to the portable screen assembly of the present invention, along a width direction of the casing, the first casing member and the second casing member are connected to each other at first ends, and separate from each other at the other ends thereof so as to form the opening.

Further, according to the portable screen assembly of the present invention, a handle may be mounted to the center portion of the top bar, and a hook may be mounted to the front end of the column for engaging the handle. Further, the hook may be horizontally rotatably mounted to the front end of the column, and when the column is laid down at a storage position, the hook may be rotated so that the column is disposed adjacent to the casing.

Further, according to the portable screen assembly of the present invention, a locking mechanism may be employed in order to fix the top bar to the casing in a storage position. The locking mechanism may be composed of an engaging portion disposed on the top bar and an engaged portion disposed on the casing. The engaged portion engages with the engaging portion. Further, the engaging portion may include a pair of engaging members oppositely disposed in the width direction of the top bar, and the engaged portion that includes a pair of engaged members disposed at the opposed opening edges of the casing which engage with the engaging members. Further, each of the engaging members may be rotatably connected to the engaging portion. Also, each of the engaging members may include an engaging end provided at one end to engage with the engaged portion, and a control portion provided at the other end for controlling the engagement and release of the engaging end. The engagement of the engaging ends with the engaged portions may be released by rotating the pair of control portions in an approaching direction, and the engaging end may be engaged with the engaged portion by rotating the pair of control portions in a separating direction. Further, a spring member may be provided in the engaging portion so that a biasing force of the spring member causes the engaging end to be pressed against the engaged portion.

Further, a rotatable locking mechanism also may be provided on the engaging portion of the locking mechanism to prevent the control portions from moving closely to each other upon engagement. The rotatable locking mechanism may be composed of a lock member fitted into an engaging portion so as to be capable of rotating between a lock position and a release position. The rotatable locking mechanism can prevent the control portions from moving closely to each other by abutting each of the opposite ends of the head of the lock member against each control portion at the lock position, and allow the control portions to move closely to each other by releasing abutting of the opposite ends and each control portion at the release position. In addition, according to the portable screen assembly of the present invention, the column may be composed of a plurality of telescopic pipes, which slide relative to each other, and a slide locking mechanism in which a pipe at a lower level locks the sliding movement of a pipe at an upper level that is slidably extended, thereby maintaining the column at a desired height.

The slide locking mechanism may include a first slide locking mechanism in which a first pipe located at the lowest level engages with a second pipe located at the upper level of the first pipe. The first slide locking mechanism may be composed of a tubular engaging portion and a tubular engaged portion. The tubular engaging portion has an engaging member and a base portion to support the engaging member, and is fitted on the outer circumferential face at the front end of the pipe at the lower level. The tubular engaged portion may be composed of at least one through hole disposed in a longitudinal direction of the pipe at the upper level, supporting the pipe at the upper level by engaging with the engaging member in an extended state. The engaging member may include a projection portion provided at one end to engage with the through hole, and a control portion provided at the other end for controlling engagement and release of the projection portion from the through hole. An engaging member may be rotatably supported by the base portion in the axial direction of the pipe. When the control portion is pressed in the direction of the pipe, the engagement between the projection portion and the through hole is released; and when the control portion is released, the projection portion engages with the through hole. Further, a second slide locking mechanism may be provided to lock the sliding movement of a third pipe. The second slide locking mechanism may comprise a pipe engaging portion disposed on the inner circumferential face at the rear end of pipe at the upper level, and a pipe engaged portion comprising a plurality of through holes formed in the longitudinal direction of a pipe at the lower level for engaging with the pipe engaging portion. In addition, a spring member may be provided so that a biasing force of the spring member causes the projection portion to be pressed against the through hole upon engagement.

Further, a control portion locking mechanism may be provided in the first slide lock for keeping the control portion in a pressed state and keeping the projection portion and the through hole in a released state. In addition, the control portion locking mechanism may comprise an engaging groove disposed at the base portion and an engaging pin disposed on the engaging member such that when the control portion is pressed in a direction of the pipes, the engaging pin may be engaged with the engaging groove. In addition, a projection portion locking mechanism may be provided at the front end of the pipe at the front end side to guide the projection portion to be engaged with the through hole by being engaging with the projection portion in the released state and keeping the engagement between the projection portion and the through hole. Further, a slide locking mechanism may be provided at the pipe at the lowest level of the column.

In addition, the slide locking mechanism may be configured by a pipe engaging portion arranged in a concave portion of a slidable member fitted on the inner circumferential face of the rear end portion of the pipe at the upper level of the front end side, and a tubular engaged portion that is configured by at least one through hole in a longitudinal direction of the pipe at the lower level to engage with the engaging portion. Further, the tubular engaging portion may be configured by an engaging member having a projection portion for engaging with the through hole at one end, and a spring member that biases the projection portion of the engaging member toward the through hole. The spring member has one end fitted to the concave portion of the slidable member and its other end fitted to the other end of the engaging member.

In addition, the slide locking mechanism may also be configured by the pipe engaging portion disposed in the concave portion of the slidable member fitted on the inner circumferential face of the rear end portion of the pipe at the upper level of the front end side, and a tubular engaged portion that is configured by a continuous peripheral groove provided in a longitudinal direction of the inner face of the pipe at the lower level. In this case, the peripheral groove is constructed by an approach route groove having a plurality of fastening portions for regulating the movement of the pipe disposed at the upper level in a contraction direction by engaging with the pipe engaging portion upon extension, and a return groove for allowing movement of the pipe disposed at the upper level into the contraction direction by releasing the engagement with the pipe engaging portion upon contraction. Further, the pipe engaging portion can be constructed by an engaging member having one end loosely fitted in the concave portion of the slidable member, and the other end having a projection portion engaged with a fastening member and capable of sliding using this one end as a support point, and a spring member that biases the projection portion of the engaging member toward the fastening portion. The spring has one end fitted to the concave portion of the slidable member and its other end fitted to one end of the engaging member.

According to the present invention, since the casing is composed of two detachable case members, the casing can be assembled by coupling the second case member with the first case member having the spring-biased roll fitted thereto. Thereby, the spring-biased roll can be properly positioned without damaging the spring-biased roll and the casing upon assembly of the screen assembly. In addition, the case member may be thinned, without decreasing the mechanical integrity of the casing by coupling two case members into one unit, so that the screen assembly may be reduced in weight and easily handled. In addition, maintenance such as exchanging a screen can be easily carried out. Further, since the top bar is used as the cover body of the casing, a cover body is not needed which enables the weight of the screen assembly to be reduced.

In addition, the column may be erectable and formed integrally with the casing. Thus, by laying the column down upon storage, the screen assembly can be made more compact and easier to carry. In use, the column is erected and extended to a desired height, and then the screen is extended. In storage, the column is contracted and laid down, then the screen is wound, and then the opening is closed by the top bar. Therefore, the screen assembly can be easily handled.

BRIEF DESCRIPTION OF THE DRAWINGS

FIG. 11A is a top view showing a base portion used for the first slide locking mechanism of the portable screen assembly shown in FIG. 9;

FIG. 11B is a front view showing a base portion used for the first slide locking mechanism of the portable screen assembly shown in FIG. 9;

FIG. 11C is a side view showing a base portion used for the first slide locking mechanism of the portable screen assembly shown in FIG. 9;

DETAILED DESCRIPTION OF THE INVENTION

The embodiment(s) of the present invention will be described below with reference to the accompanying drawings.

First Embodiment

Figure 1:
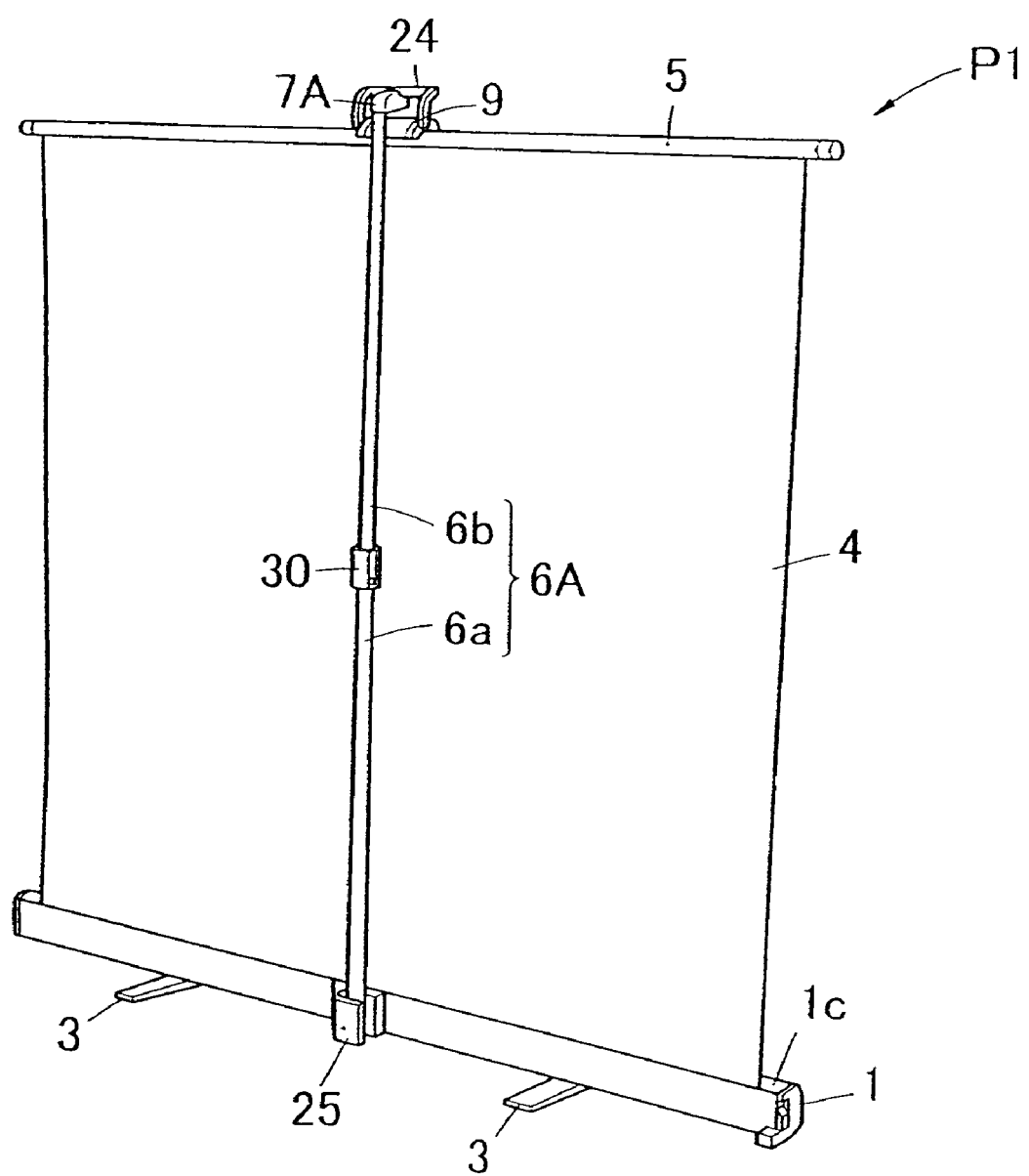
FIG. 1 is a perspective view showing a portable screen assembly according to a first embodiment of the present invention in use.

FIG. 1 illustrates a portable screen assembly according to the first embodiment of the invention during use thereof. A portable screen assembly P1 includes a casing 1, a spring-biased roll mounted in the casing (not illustrated), a screen 4 pulled out from an opening portion 1c and extended between a top bar 5 and the spring-biased roll, and a column 6 constructed approximately at the center of the casing 1 to maintain the screen 4 at a desired height. The column 6A is configured by two stages of tubular bodies 6a and 6b which are supported by a column fitting member 25 attached approximately at the center of the casing 1. The column can be slidably extended and contracted, and is maintained at a desired height by a slide locking mechanism 30. In addition, the column 6 has a hook portion 7A horizontally rotatably attached at the center of the column. The screen 4 is suspended by hooking a carrying handle 24 to the hook portion 7A. The handle is disposed at the center of the top bar 5 and is also used as an engaging member. In addition, an engaging portion 9 functions as a locking mechanism for fixing the top bar 5 at the casing 1 in storage. The engaging portion 9 is engaged with an engaged portion (not illustrated) disposed in the casing 1. In addition, the screen assembly P1 is supported by a pair of legs 3 pulled out from the bottom of the casing 1 so that the screen assembly can stand in an erected state.

Figure 2:
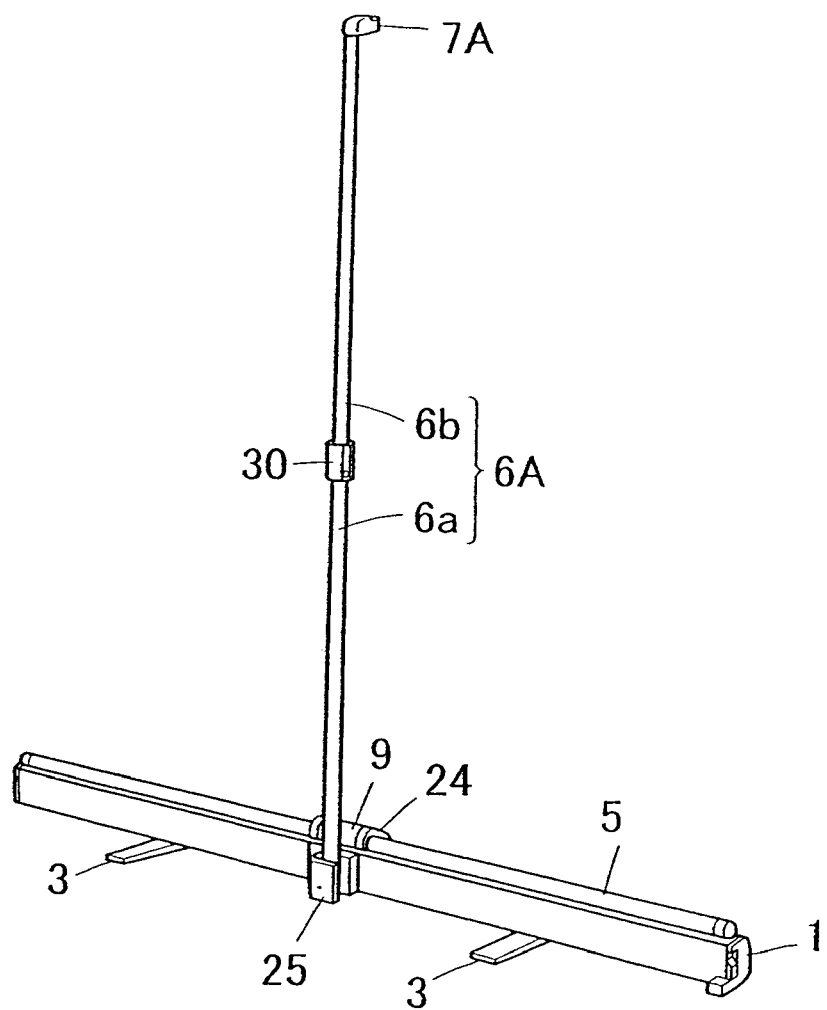
FIG. 2 is a perspective view showing the portable screen assembly of FIG. 1, shown in the state that a screen is wound.
Figure 3:
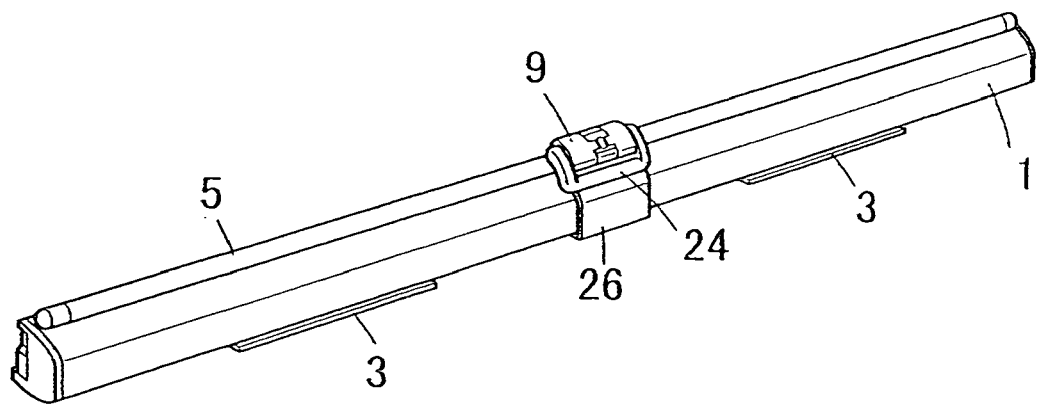
FIG. 3 is a perspective view showing the portable screen assembly of FIG. 1, shown in the stored state.

FIG. 2 illustrates the portable screen P1 with the screen 4 turned back for storage. The screen 4 is released from the engagement with the hook portion 7A, and then turned back to be housed in the casing 1. The top bar 5 closes the opening of the casing 1 as a cover body. FIG. 3 illustrates an example of the structure of the portable screen assembly in storage. Column 6A is pivoted at the column fitting member 25 to be folded. Thereby, column 6A is stored with the entire column being in parallel with the casing 1. Further, a reference numeral 26 denotes a protection member for the casing (to be described later).

Figure 4:
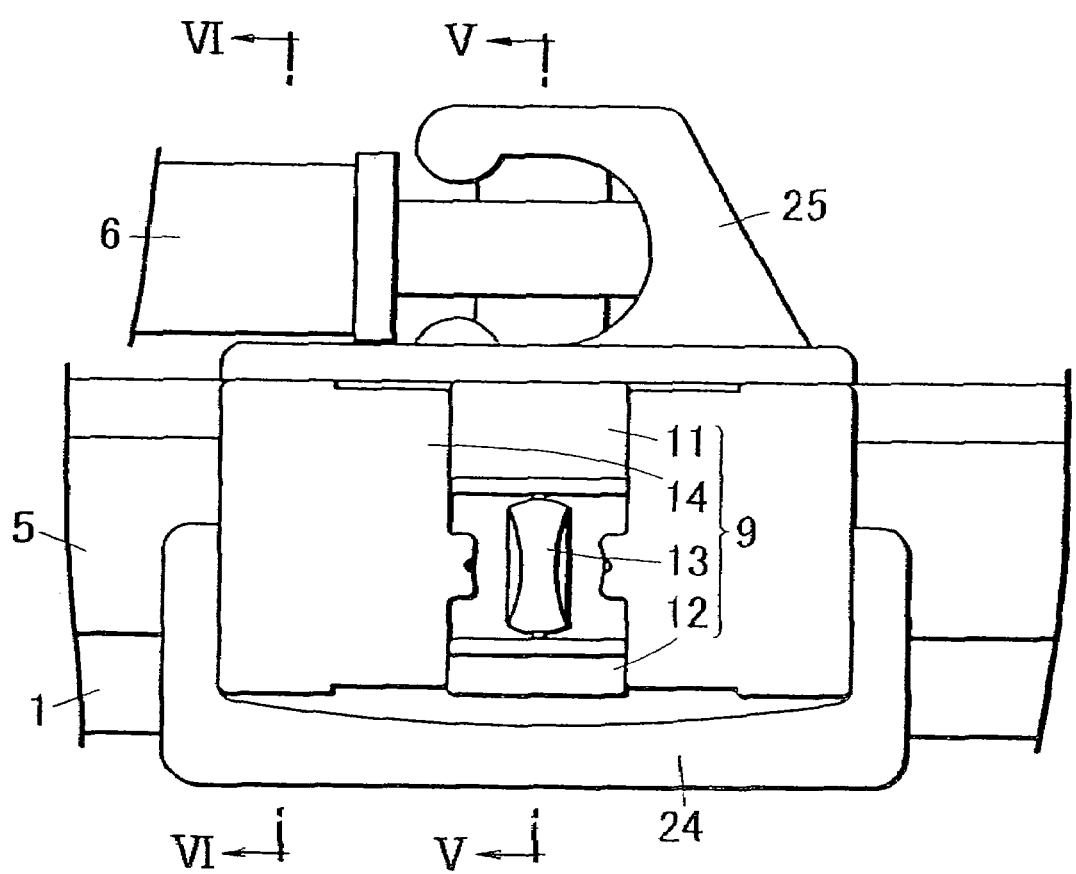
FIG. 4 is an enlarged top view of a locking mechanism shown in FIG. 3.

FIG. 4 is a partial enlarged view of the center portion of the screen assembly P1 in storage. The locking mechanism has the engaging portion 9 attached on the upper face of the top bar 5, and an engaged portion (not illustrated) disposed at the side of the casing 1 and engaged with the engaging portion 9. The engaging portion 9 has a supporting portion 14 and a pair of engaging members 11 and 12 oppositely disposed on the supporting portion 14 which move toward or away from each other in a circumferential direction of the top bar 5, and a locking mechanism 13 between the pair of engaging members for preventing the engaging members from moving closely upon engagement.

Figure 5:
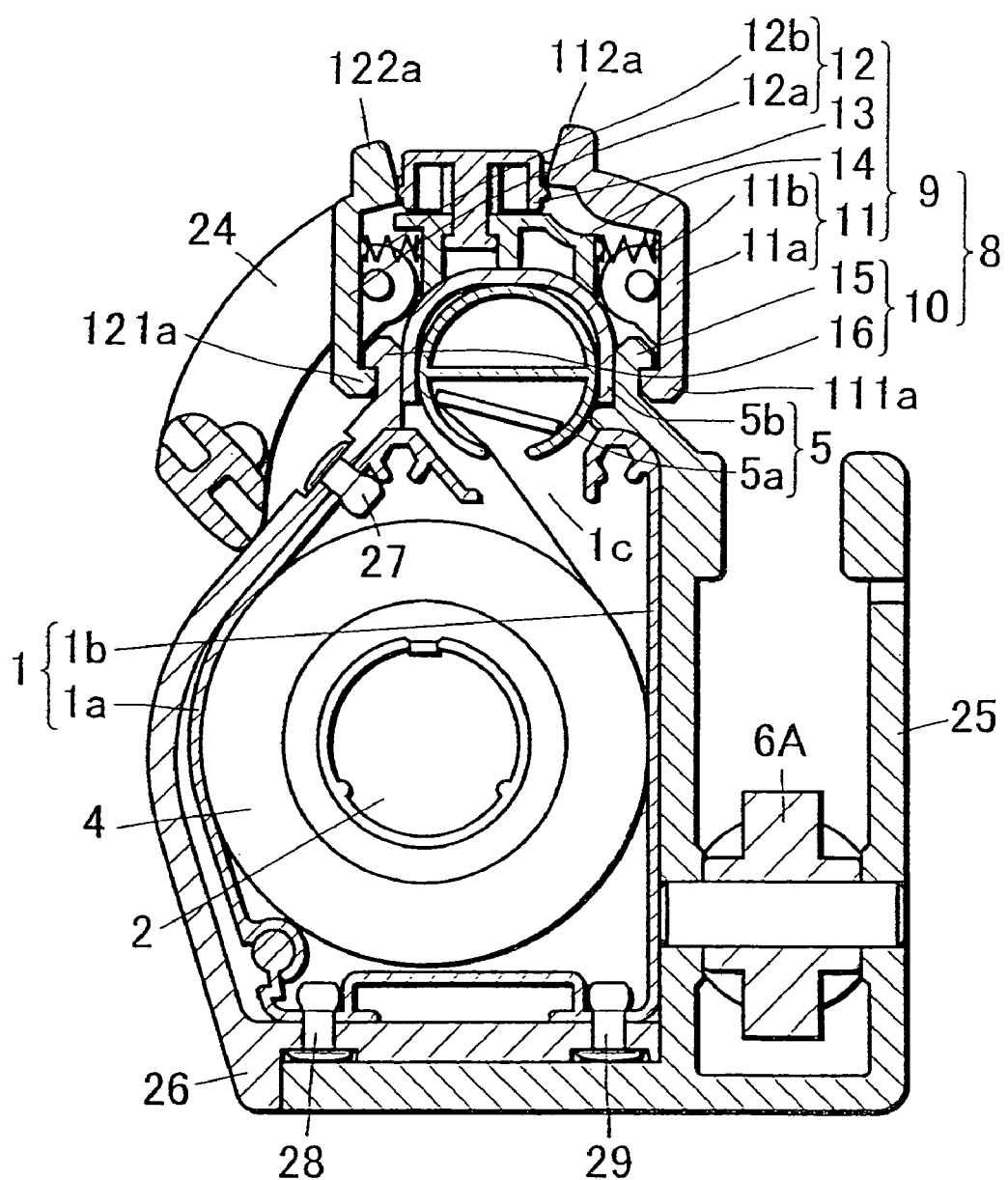
FIG. 5 is a longitudinal sectional view taken along the line of a V-V in FIG. 3.

FIG. 5 is a longitudinal sectional view taken along the line of V-V of FIG. 4. As shown in FIG. 5, the casing 1 includes a first case member 1a and a second case member 1b extending in a longitudinal direction. In the width direction, the two case members are hingedly coupled to each other at first ends thereof so as to be capable of being opened and closed. The other ends of the case members are separated to form a space 1c for pulling out the screen. In this case, the first case member 1a is disposed on the front face of the casing facing the projector, and has a curved structure extending toward; and the second case member 1b is disposed on the rear face of the casing and has an L-shape. Thereby, it is possible to store the spring-biased roll 2 on which the screen 4 is wound in the casing 1 and also to make the width of the opening 1c narrow, thereby reducing the size of the casing 1. Further, an aluminum extruded material can be used as the casing member.

On the rear face of the casing 1, the column fitting member 25 is fitted for pivoting the column 6. The protection member 26 is firmly attached to the front face of the casing 1 and extended to the bottom of the casing 1. In this case, one end of the protection member 26 is fastened at the bottom of the casing 1 by rivets 28 and 29, and the other end thereof is fastened by the rivet 27. Then, the column fitting member 25 and the protection member 26 are fitted with each other to be fixed. Further, the protection member 26 can prevent the first case member 1a from being further curved toward the side of the projector by the load of the top bar and being deformed. It is preferable to use a cover made of a lightweight resin with a high elasticity as the protection member.

The locking mechanism 8 includes the engaging portion 9 and the engaged portion 10. Further, the engaging portion 9 includes a pair of engaging portions, namely, a first engaging portion 11 and a second engaging portion 12. The first engaging portion 11 and the second engaging portion 12 include a first engaging member 11a and a second engaging member 12a, respectively. The first engaging member 11a and a second engaging member 12a are oppositely disposed in the width direction of the top bar 5 and also pivoted at a base portion 14 so as to rotate in a space that is vertical to the longitudinal direction of the top bar. Further, the engaging members 11a and 12a include engaging end portions 111a and 121a engaged with the engaged portion 10 at their respective ends, and also include control portions 112a and 122a for controlling the engagement and release of the engaging end portions 111a and 121a at their respective other ends. FIG. 5 illustrates an example that engaging nails are used as the engaging end portions 111a and 121a and also convex shaped handle portions are used as the control portions 112a and 122a.

The engaged portion 10 includes a pair of engaged members 15 and 16. The engaged members 15 and 16 are disposed at the edge of the opening of the case member 1b and the case member 1a, respectively, to be engaged with the above-mentioned engaging nails.

In addition, respective engaged portions of the first engaging portion 11 and the second engaging portion 12 are engaged with the base portion at certain ends thereof, and they have a first spring member 11b and a second spring member 12b engaged with the engaging member at the other ends thereof. These spring members constantly bias the control portion 112a and 122a in a direction that they are separated from each other and press the engaging ends in a direction of the top bar.

Further, FIG. 5 shows the engaged members 15 and 16 are formed integrally with the column fitting member 25 and the protection member 26, respectively. However, the engaged members 15 and 16 may be formed separate from the column fitting member 25 and the protection member 26.

As shown in FIG. 5, in engagement of the locking mechanism, the engaging end portions 111a and 121a are engaged with the engaged members 15 and 16, respectively. In order to release the engagement between the engaging end portion and the engaged member, the control portion 112a and 122a are pressed against the bias force of the spring member in a direction to bring them into close to each other. Thereby, the first engaging member 11a and the second engaging member 12a are rotated in a direction that the engaging end portions 111a and 121a are separated from the engaged members 15 and 16, releasing the engagement between the engaging end portion and the engaged member. On the other hand, in order to engage the engaging end portion with the engaged member, to close the opening of the casing by the top bar, the engaging portion is pressed downward so as to engage the engaged member with the engaging end portion. Due to the bias force of the spring member, the engaging end portion is engaged with the engaged member by contacting with pressure.

In addition, the lock member 13 configuring the locking mechanism of the control portion is disposed on the upper face of the base portion 14. The locking mechanism of the control portion serves as a mechanism to prevent the false operation of the locking mechanism. For example, when the stored screen assembly is carried by gripping the handle, the control portions may be accidentally pressed in a direction that they are brought into close to each other, causing the top bar to project from the casing. The locking mechanism of the control portion can prevent the locking mechanism from being released by preventing the control portions from moving when in the engaging state.

The lock member 13 is rotatably fitted to the base portion 14 so as to rotate between the lock position and the release position, and when the locking mechanism is in the engaging state, the lock member 13 is located at a locked position shown in FIG. 5. At this locked position, abutting the opposite end portions at the head of the lock member 13 against respective control portions 112a and 122a prevents the control portions from approaching one another. On the other hand, at the release position, rotating the lock member so as to release abutting between the opposite end portions and respective control portions, the control portions can move closely to each other. Thereby, at the release position, the screen can be pulled out by releasing the top bar from the casing.

Figure 6:
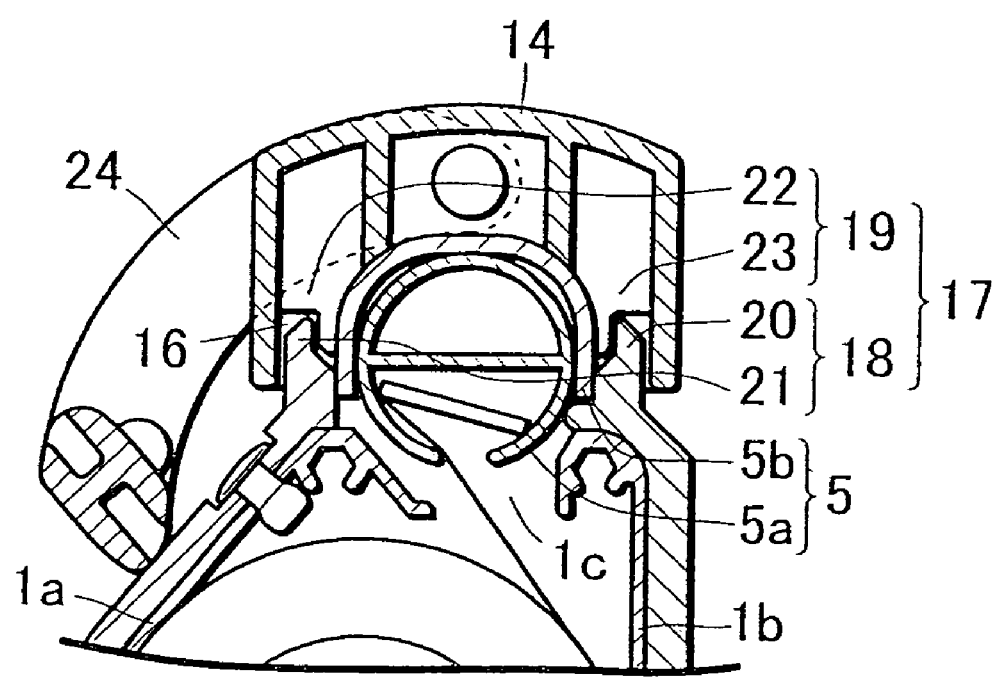
FIG. 6 is a longitudinal sectional view taken along the line of a VI-VI in FIG. 3.

FIG. 6 is a longitudinal sectional view taken along the line of VI-VI of FIG. 4 and shows the structure of a positioning mechanism 17 for accurately positioning the engaging portion and the engaged portion of the locking mechanism. The positioning mechanism 17 includes a guide portion 18 formed at the opening edge of the casing so as to be aligned with the engaged portion, and a guided portion 19 that is formed at the base portion 14 of the locking mechanism. The guided portion can be loosely fitted to the guide portion 18. The guide portion 18 includes a pair of projected edge portions 20 and 21 disposed at the opening edge to which the casing is opposed. Each projected edge portion may be formed by at least one projection portion, however, it is preferable that two and more projection portions are disposed at the opposite sides of the engaged member. On the other hand, the guided portion 19 includes guide grooves 22 and 23 formed at the front face side and the rear face side of the base portion 14.

When closing the opening of the casing with the top bar, inserting the guided portion into the guide portion, the top bar is positioned at the opening portion to be fixed there. Thereby, the engaging position of the engaging portion and the engaged portion of the locking mechanism is not misaligned, so that the top bar can be easily locked. Further, according to the present embodiment, the example that the guide groove is used as the guided portion and the projected edge is used as the guide portion is described, however, the projected edge may be used as the projected edge and the guide groove may be used as the guide portion.

Figure 7:
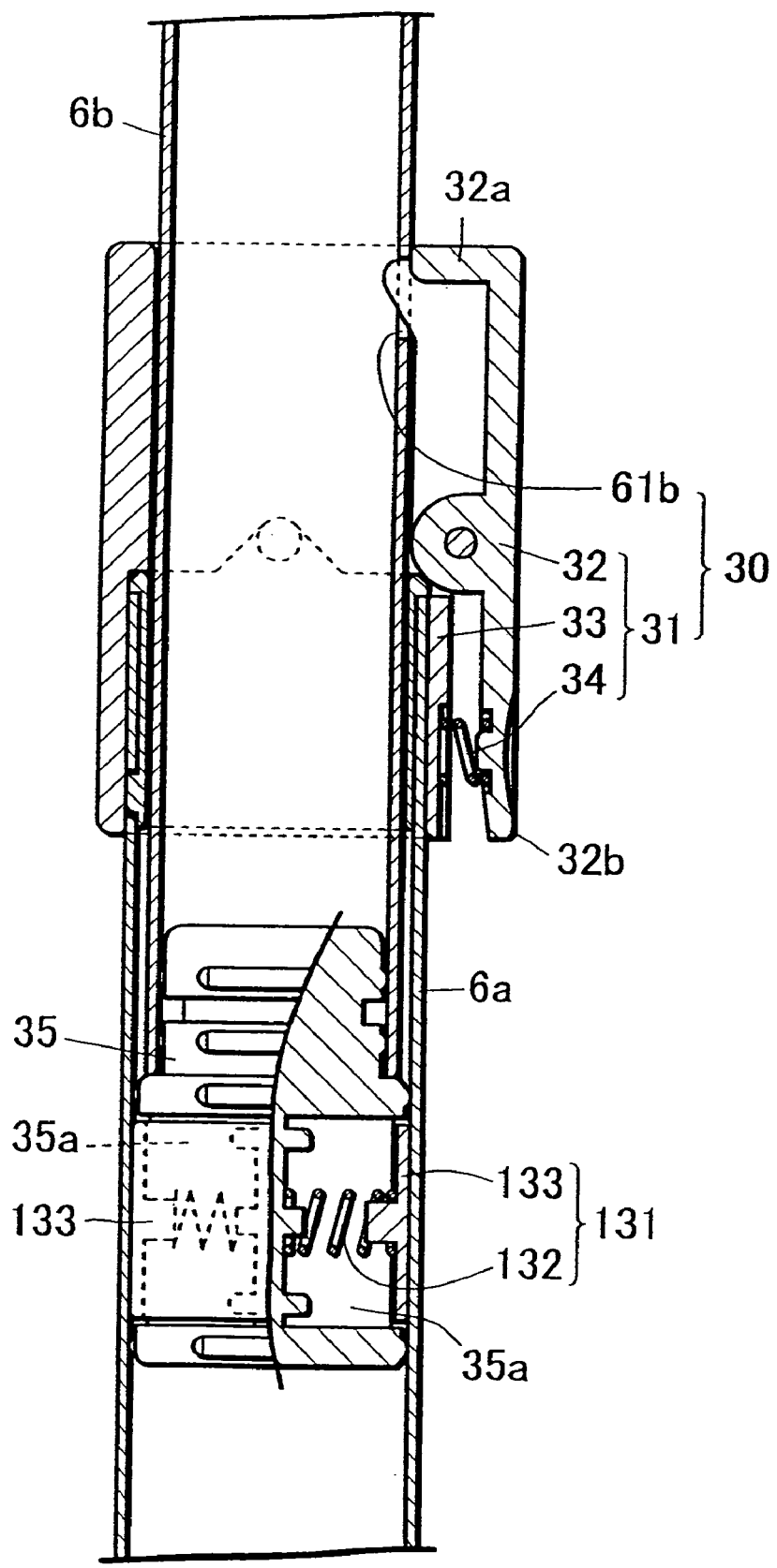
FIG. 7 is a longitudinal sectional view showing a slide locking mechanism used for the portable screen assembly shown in FIG. 1.

As shown in FIG. 7, the first slide locking mechanism 30 has a tubular engaging portion 31 that is fitted to the outer circumferential face at the front end of the first pipe 6a disposed at the lower level and has an engaging member for a pipe 32; and a tubular engaged portion which includes at least one through hole 61b disposed in a longitudinal direction of the second pipe 6b disposed at the upper level. The tubular engaged portion is engaged with the engaging member for the pipe 32 to fasten the second pipe. The tubular engaging portion 31 includes a base portion 33 fitted on the outer circumferential face at the front end of the first pipe 6a, an engaging member for a pipe 32 that is pivoted at the base portion 33, capable of rotating in the vertical portion of the outer circumferential face of the first pipe 6a. The engaging member 32 can be engaged with the through hole 61b, and a spring member 34 that biases the engaging member for the pipe 32 so as to be engaged with the through hole. In addition, on the inner circumferential face at the rear end of the second pipe 6b at the front end side, a sliding member 35 is fitted. At a pair of concave portions 35a formed symmetrically in the axial direction of the sliding member 35, a fastening portion 131 is disposed. The fastening portion includes a pair of fastening members 133 and a pair of spring members 132 that constantly bias the fastening members 133 so as to abut against the inner circumferential face of the first pipe 6a.

The engaging member for the pipe 32 includes a projection portion 32a engaged with the through hole 61b at one end, and a control portion 32b controlling the engagement and release between the projection portion 32a and the through hole 61b at the other end thereof. In addition, the spring member 34 has one end fitted to the base portion 33 and has the other end fitted to the control portion 32b. The spring member 34 constantly biases the control portion 32b in a direction separated from the base portion 33 so as to press the projection portion 32a on the outer circumferential face of the pipe. Therefore, if the second pipe 6b is pulled out from the first pipe 6a to extend the column, the projection portion 32a is engaged with the through hole 61b, and the projection portion 32a is pressed to be disposed adjacent to the through hole 61b. Thus, by locking the second pipe 6b, the column 6 can be maintained at a desired height. On the other hand, in the case of contracting the column, if the control portion 32b is pressed against the bias force of the spring member 34, the projection portion 32a is rotated in a direction separated from the outer circumferential face of the pipe so that the engagement with the through hole 61b is released. If the engagement between the projection portion 32a and the through hole 61b is released, the second pipe 6b drops down under its own weight, and a pair of fastening members 133 biased by the spring members 132 to abut against the inner circumferential face of the first pipe 6a to prevent or stop the first pipe 6a dropping down. In this state, pressing the second pipe 6b into the first pipe 6a, the column is contracted. Thus, even if the slide locking mechanism is released, the second pipe 6b does not fall suddenly, so that the column can be safely contracted. In FIG. 7, the example of using a pair of fastening portions 131 is described, however, the same advantage can be obtained if the fastening portions 131 are provided only at the concave portion 35a at one side.

Figure 8:
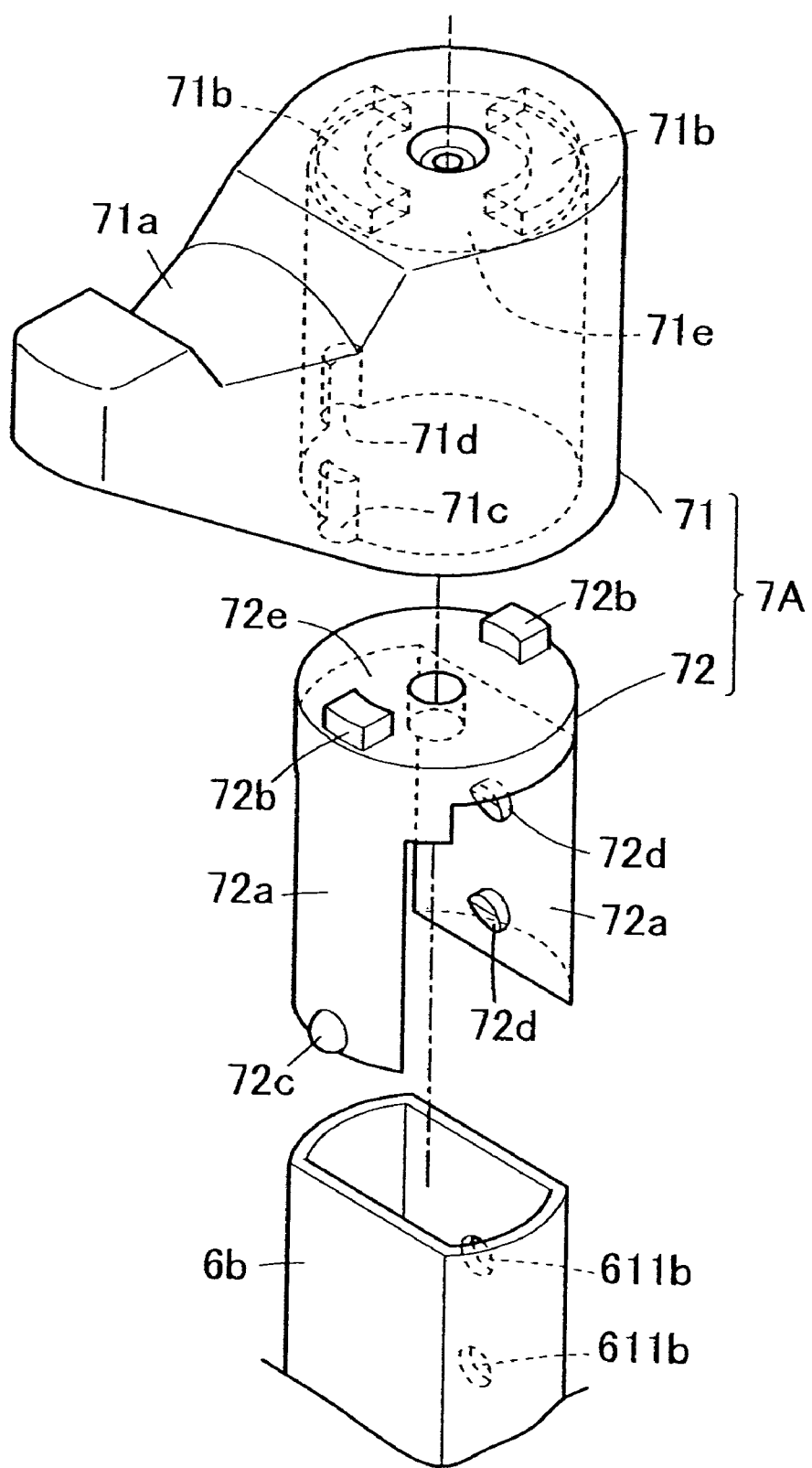
FIG. 8 is an exploded perspective view showing a hook portion used for the portable screen assembly shown in FIG. 1.

FIG. 8 is an exploded perspective view showing an example of the structure of the hook 7A. The hook 7A includes a hollow hook member 71 having a fastening portion 71a at its side that fastens a handle portion, and a supporting portion 72 that is concentrically fitted and inserted in hook member 71 to support the hook member so as to rotate horizontally. The supporting portion 72 has a circular supporting table 72e abutting against a ceiling portion 71e of the hook member 71 and a pair of supporting legs 72a supporting the supporting table 72e. The supporting portion 72 has a pair of engaging projection portions 72d at one support leg. At the front end of the second pipe 6b, a pair of engaging holes 611b is formed. The supporting portion 72 is placed over the front end of the second pipe 6b, and the pair of engaging projection portions 72d is engaged with the pair of engagement holes 611b. Thereby, the supporting portion 72 is fixed to the front end of the second pipe 6b. In addition, the supporting portion 72 includes a pair of sliding projection portions 72b disposed on the supporting table 72e so as to be line symmetry with respect to the center point of the supporting table. Further, at the ceiling portion of the hook member 71, a pair of sliding grooves 71b for preventing the rotation is formed so as to be line symmetry with respect to the center point that is arranged in a concentric fashion with respect to the center point of the supporting table 72e. By positioning the sliding projection portions 72b in each sliding groove 71b, the supporting portion 72 is fitted and inserted in the hook member 71. Each of sliding projection portions 72b is housed in the sliding groove 71b to compose two pairs of rotation preventing portions. In other words, when rotating the hook member 71 is rotated between the use position and the storage position, the sliding groove is also rotated in the same direction. In this case, by abutting the sliding projection portions 72b against the end face of the sliding groove, the further rotation of the hook member 71 is prevented.

Specifically, the hook member 71 has engaging concave portions 71c and 71d on the inner circumferential face thereof which engage with an engaging projection portion 72c of the supporting portion 72 at the use position and the storage position. The engaging concave portions 71c and 71d can be used at the use position or the storage position. For example, in the case of locating the engaging concave portion 71c at the use position, the fastening portion 71a is approximately vertical to the longitudinal direction of the top bar. Here, if the hook member 71a is rotated from the use position so as to be in parallel with the top bar, the engagement between the engaging concave portion 71c and the engaging projection portion 72c is released, and the sliding groove 71b is also rotated in the same direction as the hook member 71a. At the storage position, the engaging concave portion 71d is engaged with the engaging projection portion 72c and the hook member 71 is fixed to the supporting portion 72. On the contrary, the end face of the sliding groove 71b abuts against the sliding projection portion 72b so as to prevent the further rotation of the hook member 71. In this state, the column is pivoted and is housed so that the entire column is approximately parallel with the casing. Thereby, the fastening portion 71a does not project around, so that the present portable screen assembly can be easily stored and carried. In addition, when the excess rotational load is given to the hook member, the rotation preventing portion limits the excess rotation of the hook member to prevent the hook member from moving from the use position or the storage position. Accordingly, it is possible to easily switch between the use position and the storage position. Particularly, since two pairs of rotation preventing portions are provided so as to abut the sliding projection portion against the end face of the sliding groove at the abutting position of the line symmetry, it is possible to limit the excess rotation of the hook member more certainly.

The operation of the portable screen assembly according to the present embodiment will be described below. When the portable screen assembly is not used, as shown in FIG. 3, the column is laid down and is stored so as to be approximately in parallel with the casing. The top bar is fixed to the casing as the cover body of the casing, so that the present portable screen assembly can be stored and carried very easily. In addition, the hook portion of the front end of the column is rotatably supported by the column.

In use, the column is erected as shown in FIG. 2, then, the column is extended by releasing the first slide locking mechanism. After operating the first slide locking mechanism, the column is maintained at a certain height. Then, by releasing the control portion locking mechanism of the locking mechanism and pressing the control portions in a direction that they come close to each other, the top bar is released from the casing. Next, the top bar is pulled upward, the screen is pulled out from the spring-biased roll against the elastic force of the spring mounted to the spring-biased roll and gravitational force. Then, by fastening the handle disposed at the top bar on the hook portion of the column, the screen is held in an extended state.

When the screen is not in use, the handle is unfastened from the hook portion, and the top bar is let down on the opening with the handle gripped. In this case, the guide portion of the positioning mechanism contacts the guided portion at first, and letting down the top bar as it is, the guide portion is inserted into the guided portion. In this state, the engaging portion and the engaged portion of the locking mechanism is positioned. Next, the top bar is pressed downward, the locking mechanism is operated, and the top bar is fixed to the casing. Further, the slide locking mechanism of the column is released, the column is contracted, and the hook portion is rotated so that the hook portion does not project around. Then, the column is rotated and folded, so as to be stored in parallel with the casing.

According to the present embodiment, the top bar is used also as the cover body of the casing, and the casing includes the first case member and the second case member that are hingedly coupled to each other at one side of the casing. Thus, without decreasing the mechanical integrity of the casing, the casing member is thinned, which makes it possible to reduce the weight of the screen assembly.

In addition, since the column is formed integrally with the casing and also erectable, the size of the screen assembly can be further reduced in storage by laying the column down.

Further, due to the single operation of pressing the control portion of the locking mechanism, the top bar can be easily fixed to the casing.

In addition, pressing down the column in the state that the locked state of the second pipe is released by pressing the control portion of the spring locking mechanism, the column can be easily contracted.

Second Embodiment

In the screen assembly according to the second embodiment will be explained with an example that another slide locking mechanism is used in place of the first slide locking mechanism in to the first embodiment.

Figure 9:
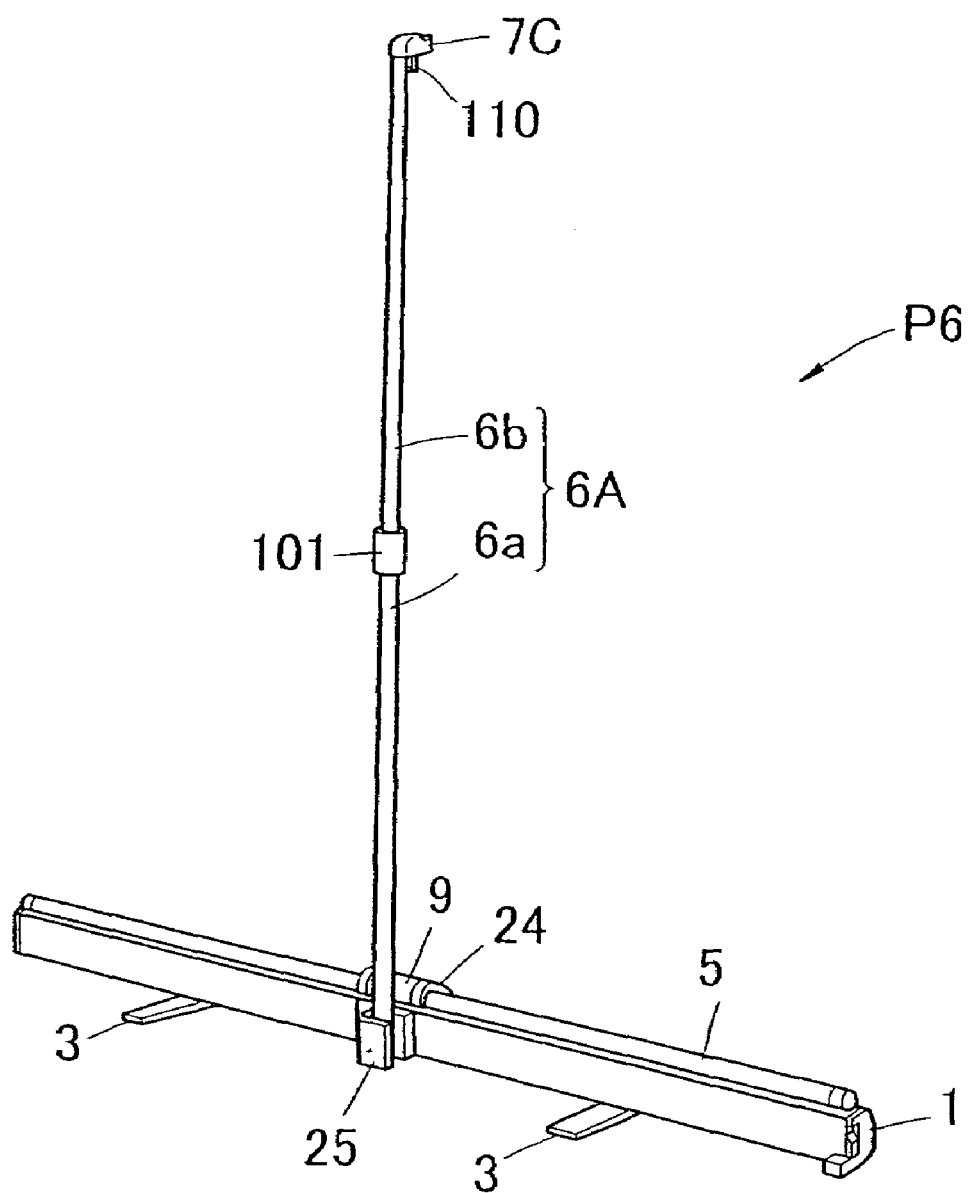
FIG. 9 is a perspective view showing a portable screen assembly according to a second embodiment of the present invention, shown in the state that a screen is turned back.

FIG. 9 is a perspective view showing the structure of a screen assembly P6 in the state that the screen is turned back. A column 6A includes the first pipe 6a at the lower level and the second pipe 6b at the upper level. In this embodiment, a tubular engaging portion 101 of the first slide locking mechanism is disposed at the front end of the first pipe 6a, and a projection portion locking mechanism 110 for releasing the released state of the first slide locking mechanism is disposed at the lower portion of a hook portion 7C. Otherwise, the second embodiment can be configured according to the same method as the first embodiment.

The first slide locking mechanism used in this embodiment includes a tubular engaging portion disposed on the outer circumferential face of the front end of the first pipe 6a, and a tubular engaging support that includes a plurality of through holes formed in the longitudinal direction of the second pipe 6b and engaged with the tubular engaging portion.

Figure 10A:
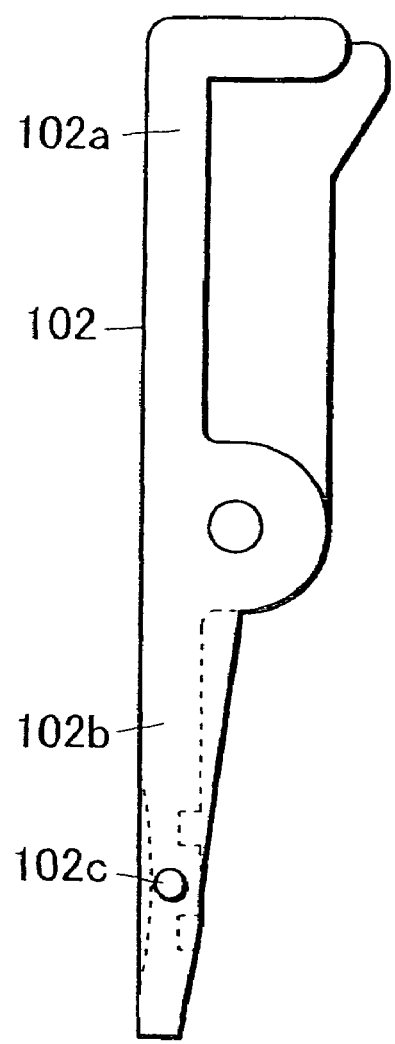
FIG. 10A is a side view showing an engaging member used for a first slide locking mechanism of the portable screen assembly shown in FIG. 9.
Figure 10B:
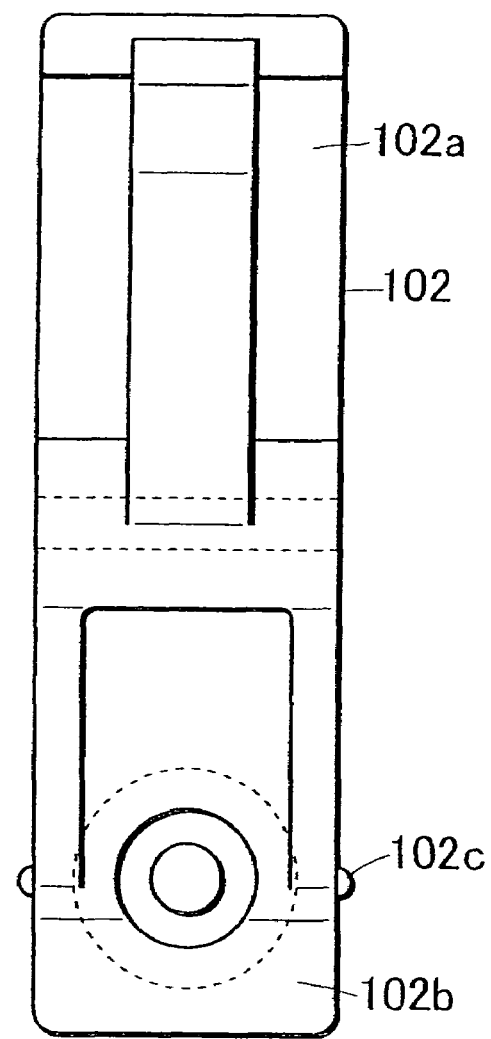
FIG. 10B is a front view showing an engaging member used for a first slide locking mechanism of the portable screen assembly shown in FIG. 9.

FIGS. 10A to 10B and FIGS. 11A to 11C illustrate the structures of an engaging member 102 of the tubular engaging portion 101 and a base portion 103. FIG. 10A and FIG. 10B are a side view and a front view of the engaging member 102, respectively; and FIGS. 11A, 11B, and 11C are a top view, a front view, and a side view of the base portion 103, respectively.

The engaging member 102 is pivoted on the base portion 103 at its center. The engaging member 102 has a projection portion 102a that engages with the through hole disposed at one end, and a control portion 102b that controls the engagement and release between the projection portion 102a and the through hole disposed at the other end. Further, on the opposite side faces of the control portion 102b, a pair of engaging pins 102c is disposed.

On the other hand, the base portion 103 for pivoting the engaging member 102 has a concave groove 103a that extends in the axial direction of the outer circumferential face of the base portion 103 and houses the engaging member 102, a pair of axial holes 103b for pivoting the engaging member 102, and a pair of engagement grooves 103c engaged with the engaging pin. The engaging grooves 103c are formed from the outer circumferential face side into a pipe side. The engagement grooves 103c have an ending portion 1032c at the front end at the pipe side. The ending portion 1032c continues to a sliding groove portion 1031c via a constricted portion 1033c.

The operation of this slide locking mechanism will be described with reference to the longitudinal views shown in FIGS. 12 to 16 below.

Figure 12:
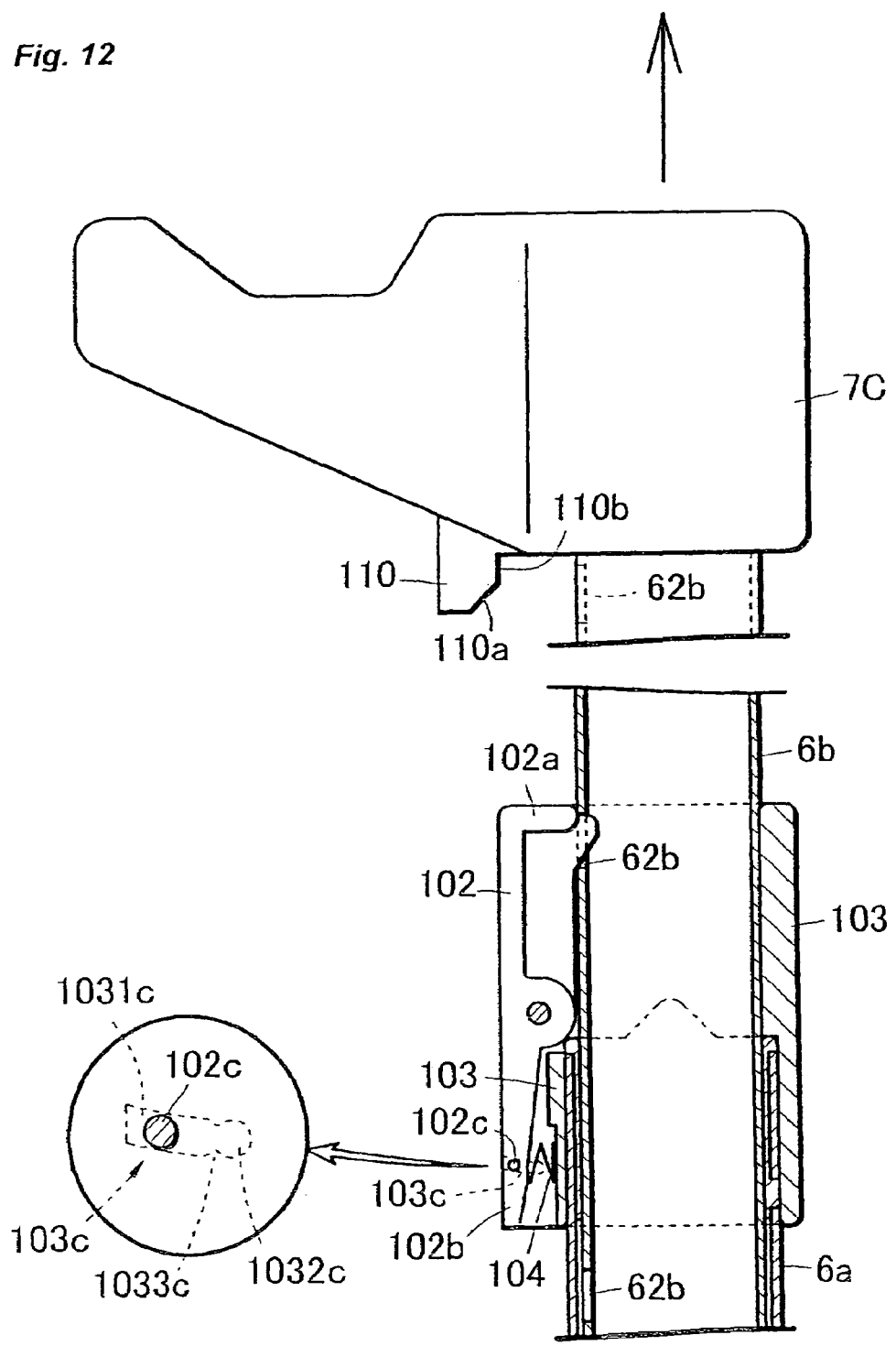
FIG. 12 is a longitudinal sectional view (1) showing the expansion and contraction operation of a column of the portable screen assembly shown in FIG. 9.

FIG. 12 shows a column 6A starting to extend. A first slide locking mechanism 100 includes a through hole 62b and the tubular engaging portion 101 that are fitted to the front end of the first pipe 6a, and the projection portion 102a is engaged with the through hole 62b. On the lower portion of the hook portion 7C, a projection portion locking mechanism 110 including the hook portion 7C and the engaging projection portion is disposed. According to the present embodiment, the hook portion 7C and the projection portion locking mechanism 110 are separately formed, and the hook portion 7C can be horizontally rotatably formed. On the contrary, the projection portion locking mechanism 110 is firmly fixed so as to be aligned with the control portion 102 in the axial direction. Further, the projection portion locking mechanism 110 and the engaging member 102 are disposed at the front face side of the column on which the screen is fastened.

Figure 13:
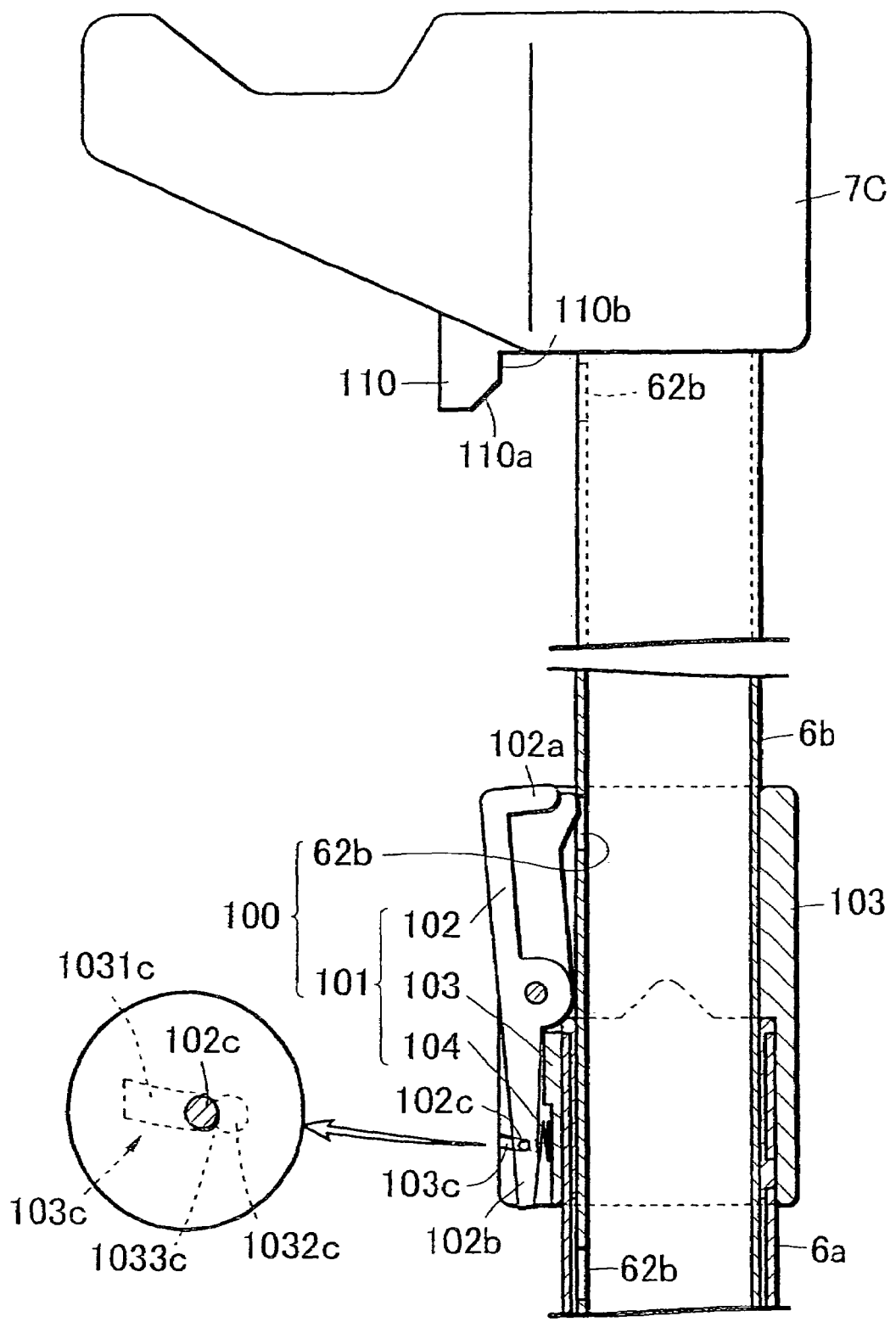
FIG. 13 is a longitudinal sectional view (2) showing the expansion and contraction operation of a column of the portable screen assembly shown in FIG. 9.

FIG. 13 illustrates the column extended to the longest length. In the case of extending the column from the state shown in FIG. 12, the hook portion 7C is pulled up with the control portion 102b pressed. In this case, the first slide locking mechanism is released and the second pipe 6b is released, so that the second pipe 6b can be easily pulled out from the first pipe 6a. Next, when the control portion 102b, is no longer expressed the control portion 102b is separated from the base portion 103 due to the bias force of the spring member 104, the projection portion 102a is engaged with the through hole 62b, and the pipe 6b is locked by the pipe 6a. In this state, the screen assembly can be used by fastening the screen on the hook portion 7C.

Figure 14:
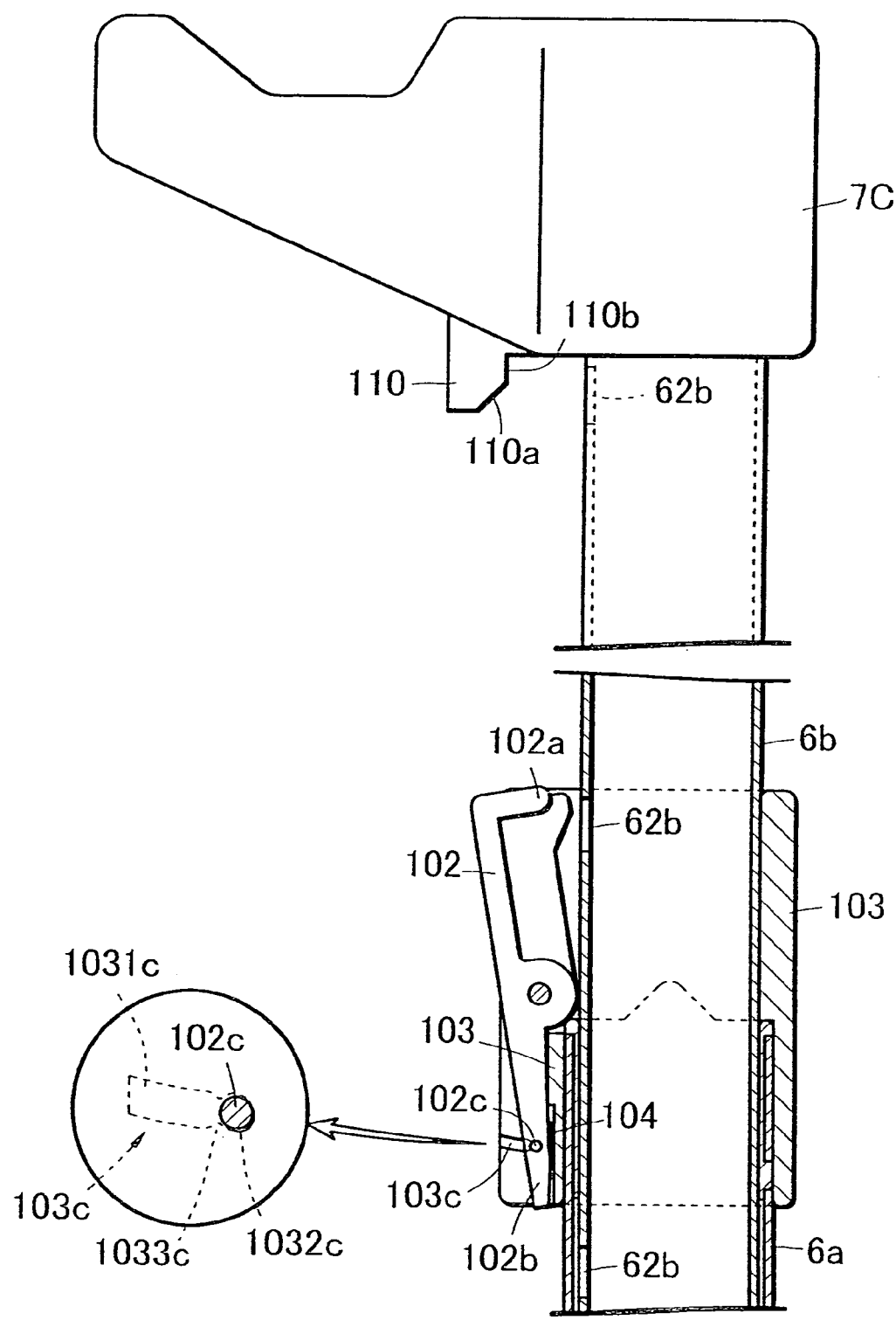
FIG. 14 is a longitudinal sectional view (3) showing the expansion and contraction operation of a column of the portable screen assembly shown in FIG. 9.

FIG. 14 shows the beginning of contraction of the column for storage. At first, the screen is turned back by detaching the screen from the hook portion 7C and bringing down the top bar. Next, the first slide locking mechanism is operated. In other words, the control portion 102b is strongly pressed in the direction of the base portion 103, releasing the engagement between the projection portion 102a and the through hole 62b. On the other hand, the engaging pins 102c slide in the engagement groove 103c in the direction of the base portion 103 into the ending portion 1032c through the constricted portion 1033c. Then, the engaging pins 102c are engaged and fixed there. In this case, since the constricted portion 1033c is narrower than the ending portion 1032c, the movement of the engaging pins 102c to the constricted portion 1033c is inhibited, and the engaging pins 102c are fixed to the ending portion 1032c. Thereby, the control portion 102b is kept in a pressed state and the column can be pushed down.

Figure 15:
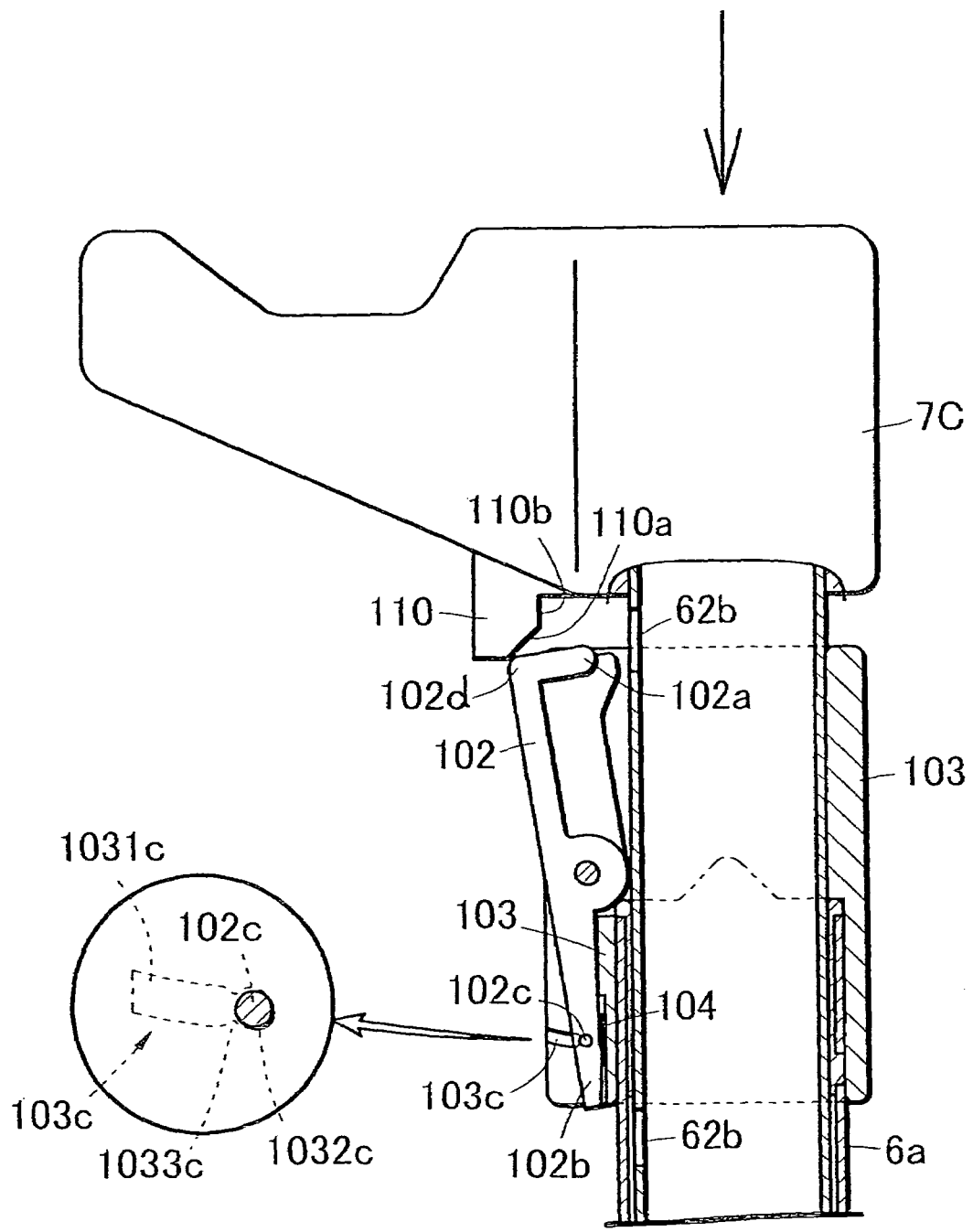
FIG. 15 is a longitudinal sectional view (4) showing the expansion and contraction operation of a column of the portable screen assembly shown in FIG. 9.
Figure 16:
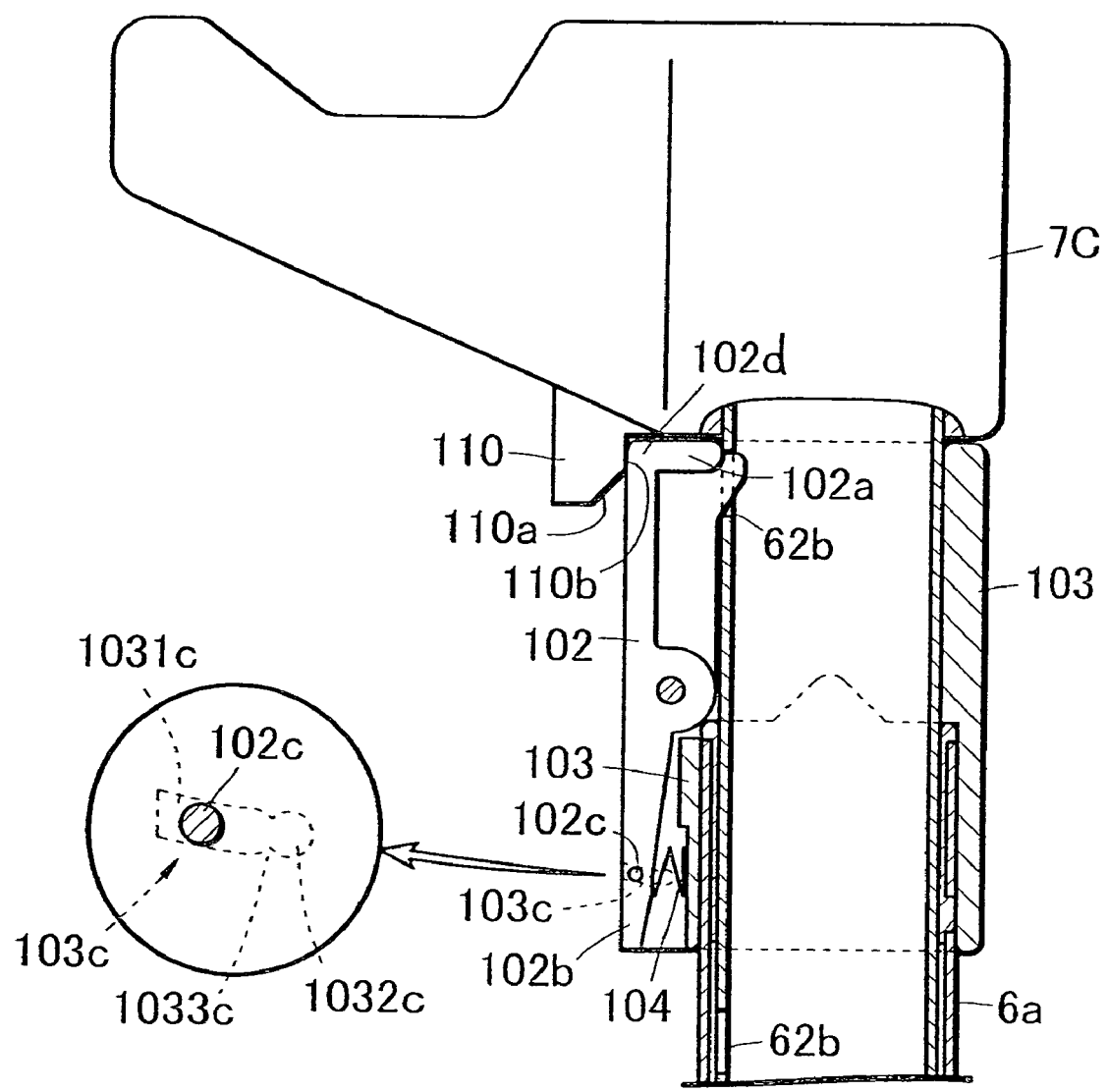
FIG. 16 is a longitudinal sectional view (5) showing the expansion and contraction operation of a column of the portable screen assembly shown in FIG. 9.

FIG. 15 shows the state that the column is pushed down from the state shown in FIG. 14. The slide locking mechanism is easily released by pushing down the second pipe 6b, the second pipe 6b is pushed down, and its front end comes close to the slide locking mechanism. In other words, the projection portion locking mechanism 110 includes an abutting portion 110a that is formed by an inclined face that can abut against an angle portion 102d forming the base portion of the projection portion 102a, and a fixed portion 110b that is formed by a vertical face continued to the inclined face and can be engaged with the angle portion at its front end. If the column is pushed down, the abutting portion 110a of the engaging projection portion 110 abuts against the angle portion 102d. Further, if the column is pushed down, the angle portion 102d is pressed into the direction of the pipe and at the same time, due to the lever operation, the engaging pins 102c move from the ending portion 1032c to the sliding groove portion 1031c. Then, lock of the control portion 102b is released. Further, if the column is contracted into the shortest length by pushing down the column, as shown in FIG. 16, by the abutting portion 110a, the angle portion 102d becomes engaged with the fixed portion 110b. At the same time, the front end of the projection portion is engaged with the through hole 62b. In this state, the projection portion 102a is locked being fixed to the projection portion locking mechanism 110. Subsequently, rotating the hook portion 7C so as not to project around, and then, rotating and laying the column down, the column is stored to be in parallel with the casing.

According to the present embodiment, in addition to the advantage obtained in the first embodiment, the following advantages can be further obtained.

Since the free state of the first slide locking mechanism is changed into the lock state by abutting and engaging the projection portion locking mechanism disposed at the lower portion of the hook portion 7C against the projection portion of the first slide locking mechanism, due to the single operation of push down the column, it is possible to contract the column and the slide lock of the pipe at once. Further, since the engaging member is disposed at the front face of the column, operating the engaging member at the front face of the screen assembly, the column can be contracted. Therefore, as compared to the case that the engaging member is disposed at the rear face of the column, the column can be contracted more easily.

Third Embodiment

Figure 17:
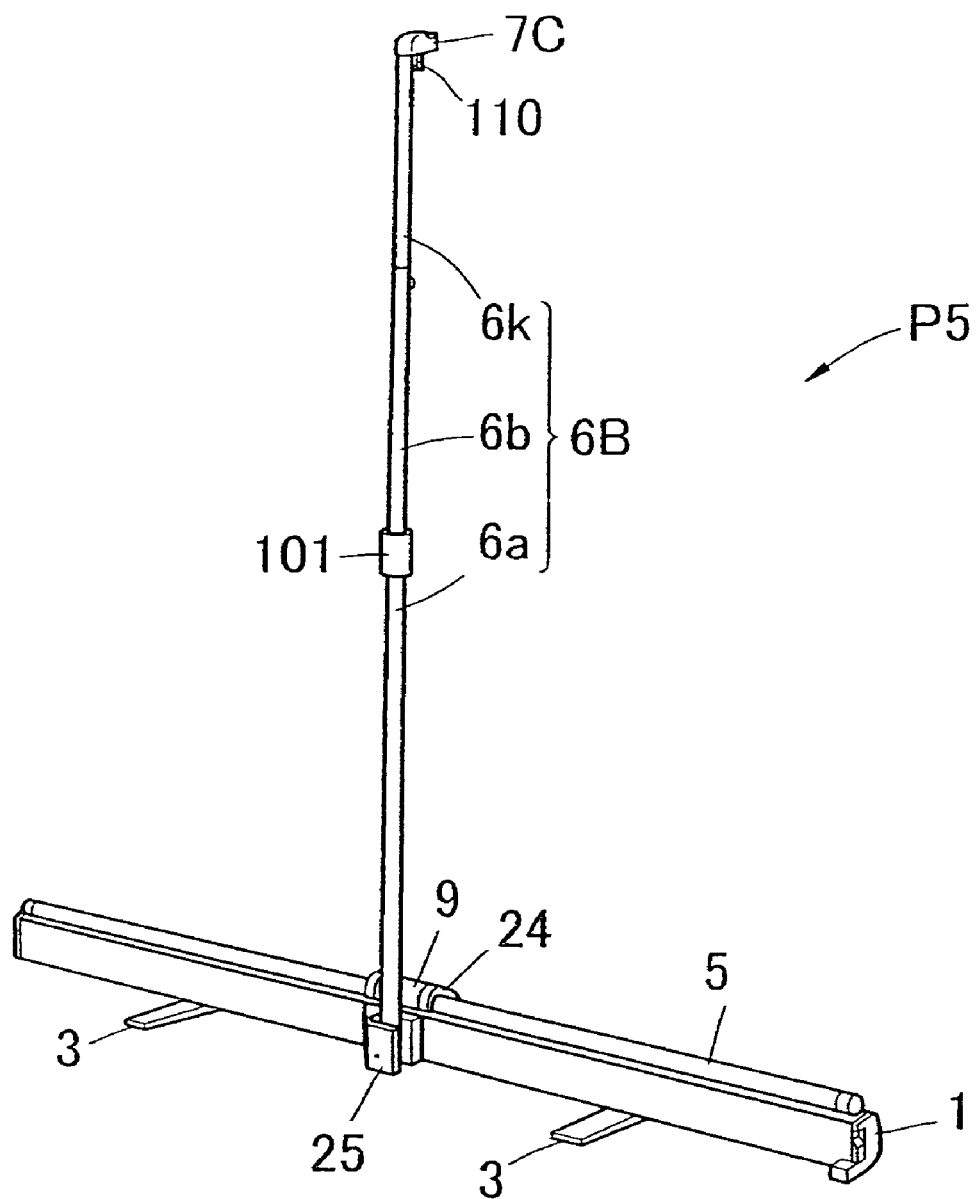
FIG. 17 is a perspective view showing a portable screen assembly according to a third embodiment of the present invention, shown in the state that a screen is turned back.

In the screen assembly according to the third embodiment, three stages of pipe are used in the column. FIG. 17 is a perspective view showing the structure of a screen assembly P5 in the state that the screen is turned back. A column 6B can be composed by the same method as the second embodiment except that the column is composed of the first pipe 6a at the lower level, the second pipe 6b at the middle level, and a third pipe 6k at the upper level.

Figure 18:
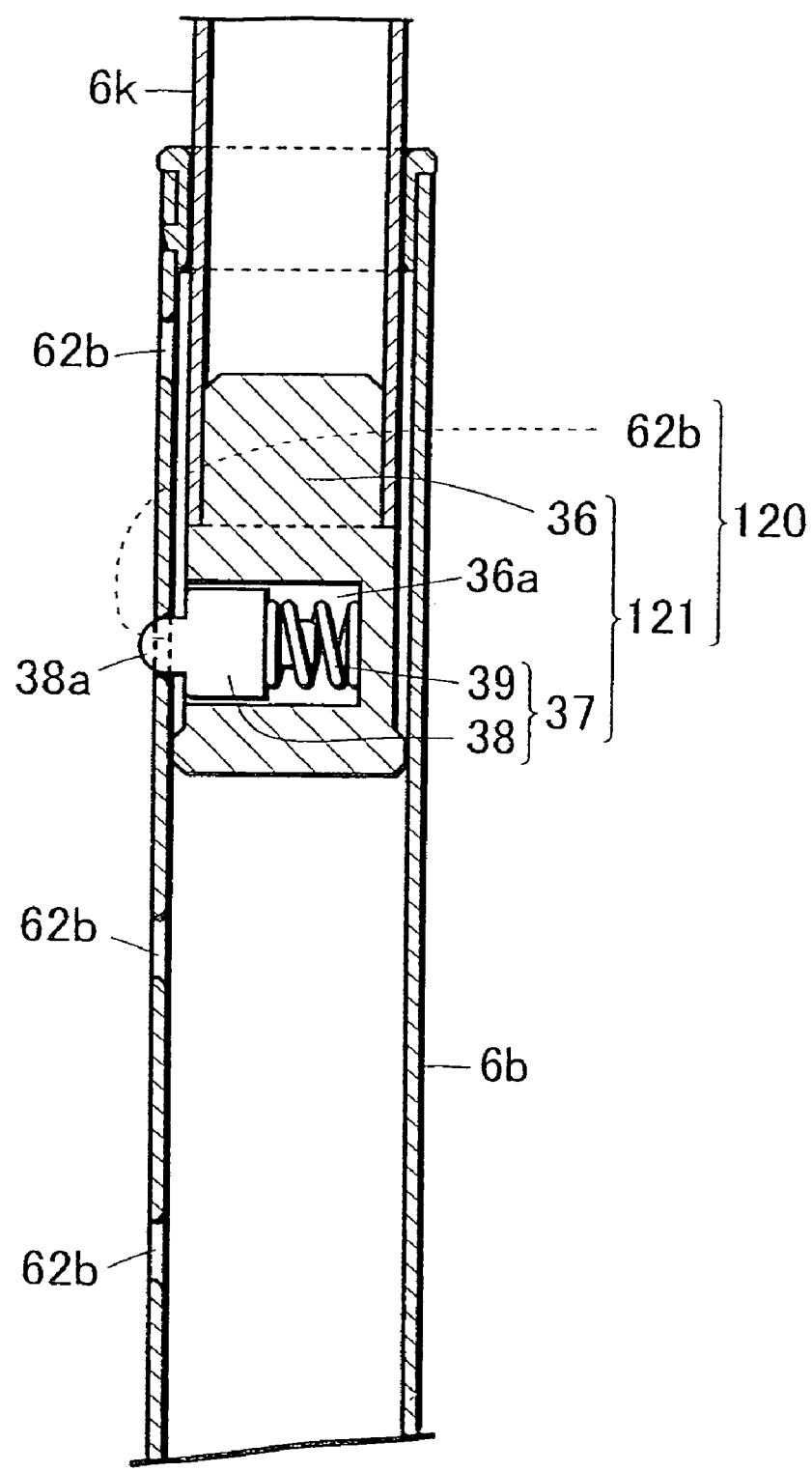
FIG. 18 is a longitudinal sectional view showing a second slide locking mechanism used for the portable screen assembly shown in FIG. 17.

The structure of the second slide locking mechanism is shown in FIG. 18. A sliding member 36 is fitted on the inner circumferential face of the rear end portion of the third pipe 6k. A pipe engaging portion 37 includes an engaging member 38 arranged in a concave portion 36a of the sliding member 36 and a spring member 39. The spring member 39 has one end engaged with the concave portion 36a and the other end engaged with the engaging member 38 and biases the engaging member 38. A plurality of through holes is formed in a longitudinal direction at the front end of the second pipe 6b. The plurality of through holes 62b constitutes the tubular engaging support which engages with the pipe engaging portion 37. The engaging member 38 has a ball-type projection portion 38a at its front end. The ball-type projection portion 38a engages with the through hole 62b by being pressed by the spring member 39 and, thus, the third pipe 6k is fixed. In order to release the engagement between the ball-type projection portion 38a and the through hole 62b, the ball-type projection portion 38a can be directly pressed against the bias force of the spring member 39 or the ball-type projection portion 38a can be indirectly pressed into the concave portion 36a by pushing down the third pipe 6k. A ball-type projection portion 38a made from metal or a resin can be used, however, resin is preferable. Further, the edge of the through hole can be round or tapered to be enlarged at the side of the third pipe 6k. Thereby, it is possible to reduce the frictional force between the through hole and the engaging member. Therefore, even if the ball-type projection portion 38a is not directly pressed, the engagement between the ball-type projection portion 38a and the through hole 62b can be easily released by pulling out or pushing the third pipe 6k from or in the second pipe 6b.

The operation of this slide locking mechanism will be described below. Further, the operation of the first slide locking mechanism will be described with reference to FIGS. 12 to 16.

When the control portion 102b is pressed in the state that the column is contracted to the shortest length, the first slide locking mechanism is released, the second pipe 6b is released, and the second pipe 6b can be easily pulled out from the first pipe 6a (FIG. 12). In addition, by strongly pulling out the third pipe 6k from the second pipe 6b, the third pipe 6k can be pulled out without operating the second slide locking mechanism, namely, without engaging the ball-type projection portion 38a with the through hole 62b. Accordingly, by only pulling out the hook portion 7C, the second pipe 6b and the third pipe 6k are pulled out from the first pipe 6a; this makes it possible to extend the column to the longest length.

After that, in the longest state, if the control portion 102b is lightly pressed, due to the bias force of the spring member, the control portion 102b is separated from the base portion 103, due to the lever operation, the projection portion 102a is engaged with the through hole 62b, and the pipe 6b is locked by the pipe 6a (FIG. 13). In this state, the screen assembly can be used by fastening the screen on the hook portion 7C.

Next, when contracting the column for storage, at first, the screen is turned back by detaching the screen from the hook portion 7C and letting down the top bar. Next, the first slide locking mechanism is operated. In other words, when the control portion 102b is strongly pressed in the direction of the base portion 103, due to the lever operation, the engagement between the projection portion 102a and the through hole 62b is released. The engaging pins 102c slide in the engaging groove 103c in the direction of the base portion 103 into the ending portion 1032c through the constricted portion 1033c. Then, the engaging pins 102c are engaged and fixed there (FIG. 14). In this case, since the constricted portion 1033c is narrower than the ending portion 1032c, movement of the engaging pins 102c to the constricted portion 1033c is inhibited, and the engaging pins 102c are fixed to the end portion 1032c. Thereby, the control portion 102b is kept in a pressed state and the column can be pushed down.

Next, the column is pushed down. The second slide locking mechanism is easily released by pushing down the third pipe 6k. Then, the second pipe 6b is pushed down, and its front end comes close to the second slide locking mechanism. In other words, when the column is pushed down, the abutting portion 110a of the projection portion locking mechanism 110 abuts against the angle portion 102d (FIG. 15). Further, when the column is pushed down, the angle portion 102d is pressed in the direction of the pipe, and at the same time, due to the lever operation, the engaging pins 102c move from the ending portion 1032c to the sliding groove portion 1031c. Then, the control portion 102b is released. Further, if the column is contracted into the shortest length by pushing down the column, as shown in FIG. 16, being guided by the abutting portion 110a, the angle portion 102d becomes engaged with the fixed portion 110b. At the same time, the front end of the projection portion is engaged with the through hole 62b. In this state, the projection portion 102a is fixed to the projection portion locking mechanism 110. Subsequently, the hook portion 7C is rotated so as not to project around when stored. Then, the column is rotated and laid down so as to be stored in parallel with the casing.

According to the present embodiment, in addition to the advantage obtained in the second embodiment, the following advantages can be further obtained.

At first, by composing the column of three stages of the pipe, the column is longer so that the large screen can be extended. Further, the second slide locking mechanism is provided, engagement of which can be easily released by pulling out or pushing in the third pipe. On the other hand, abutting and engaging the projection portion locking mechanism disposed at the front end of the third pipe against or with the projection portion of the first slide locking mechanism, the free state of the first slide locking mechanism is changed into the lock state, so that by the single operation of pushing down the column, it is possible to push down the column from the longest state to the shortest state at once which makes contracting the column very easy.

The screen assembly according to the present invention is not limited to the first to third embodiments, and screen assembly according to the present invention may include the screen assemblies according to various modified examples composed of the following component members.

Figure 19:
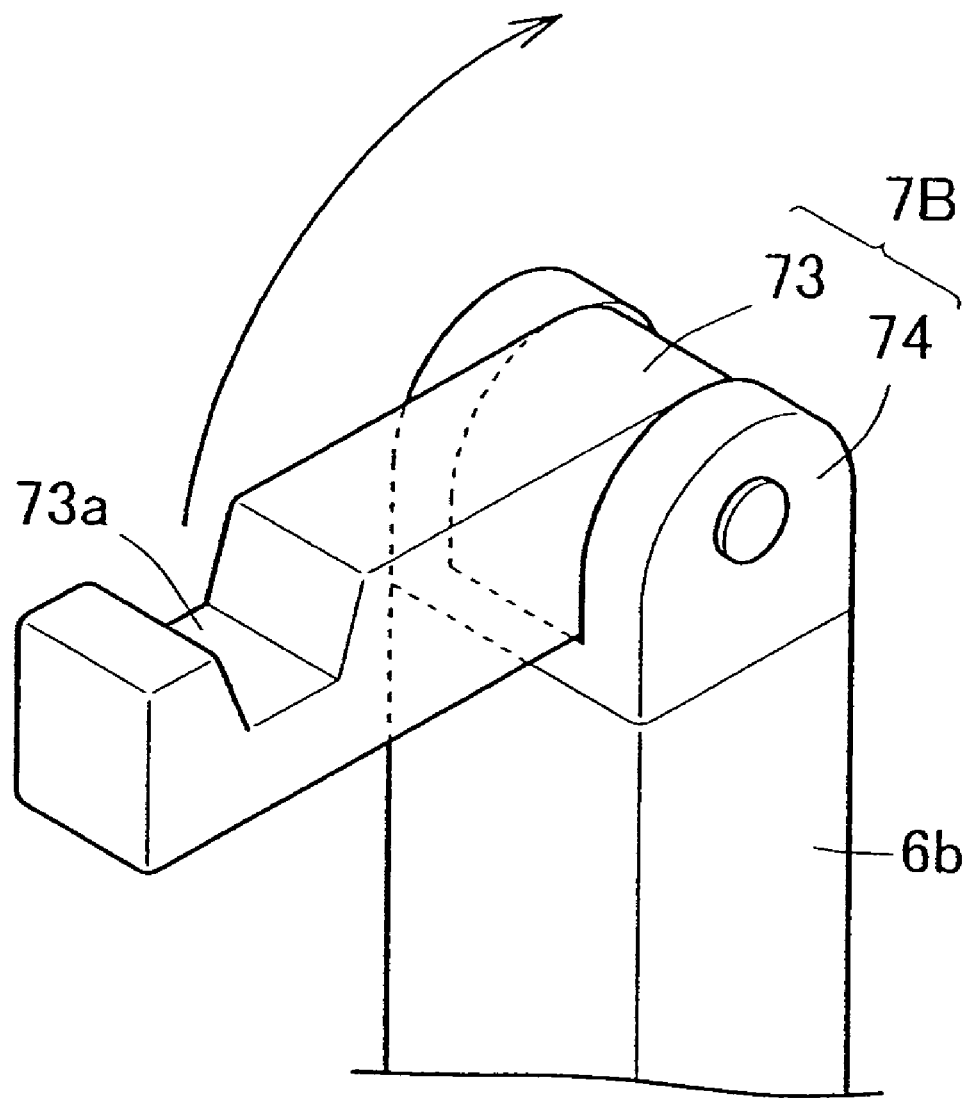
FIG. 19 is an exploded perspective view showing a modified example of the hook portion used for the portable screen assembly shown in FIG. 1.

FIG. 19 shows a modified example of the hook portion shown in FIG. 8. A hook portion 7B includes a supporting portion 74, a rotating portion 73 that is pivoted by the supporting portion 74 capable of being rotated on the vertical flat face with respect to a longitudinal direction of the top bar, and a fastening portion 73a that fastens the handle. The supporting portion 74 is fixedly inserted into the front end of second pipe 6d of the column. In use, the handle is fastened by putting the rotating portion 73 down into a vertical direction of the top bar. Thereby, it is possible to hold the screen in a stretch state. On the other hand, in storage, by pulling up the rotating portion 73 and erecting it so as to be approximately aligned with the column, the column is laid down and stored so as to be approximately in parallel with the casing. Thereby, the rotating portion 73 does not project around, so that the present portable screen assembly can be easily stored and carried.

Figure 20:
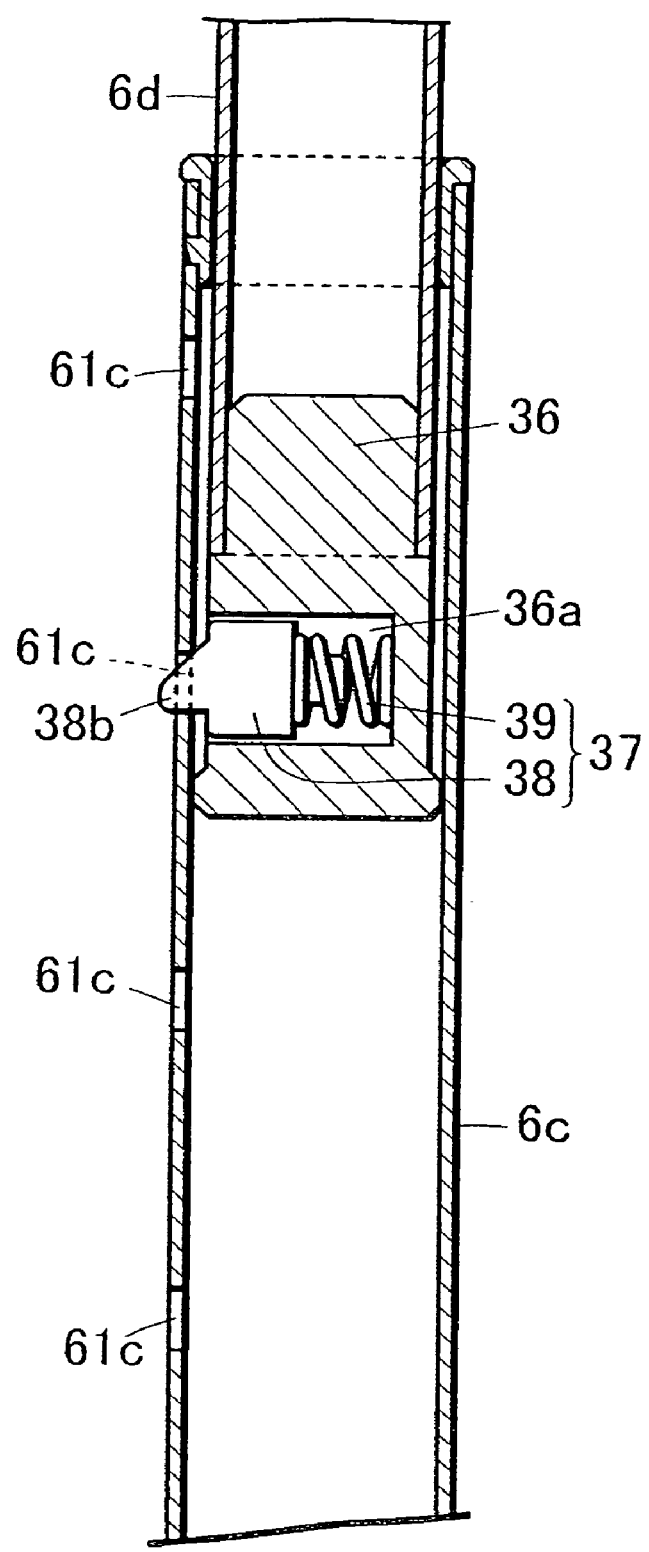
FIG. 20 is a longitudinal sectional view showing a first modified example of the slide locking mechanism shown in FIG. 7.

FIG. 20 shows a first modified example of the slide locking mechanism used in the first embodiment.

In the slide locking mechanism according to the present modified example, the sliding member 36 is attached on the inner circumferential face at the rear end of the second pipe 6d at the front end, and the engaging member 38 and the pipe engaging portion 37 composed of the spring member 39 that biases the engaging member 38 are disposed in the concave portion of this sliding member 36. On the contrary, a plurality of through holes is formed in a longitudinal direction at the front end of the first pipe 6c, and this plurality of through holes 61c composes the tubular engaging support 61c engaged with the pipe engaging portion 37. Pulling the second pipe 6d from the first pipe 6c and engaging a front end projection portion 38b of the engaging member 38 with the desired position in the plurality of through holes, the second pipe 6d is fastened to hold the column at the desired height. By pressing the front end projection portion 38b, it is possible to release the fastening of the second pipe 6d.

According to the present modified example, with the simple structure, the height of the screen can be adjusted stepwise.

Figure 21:
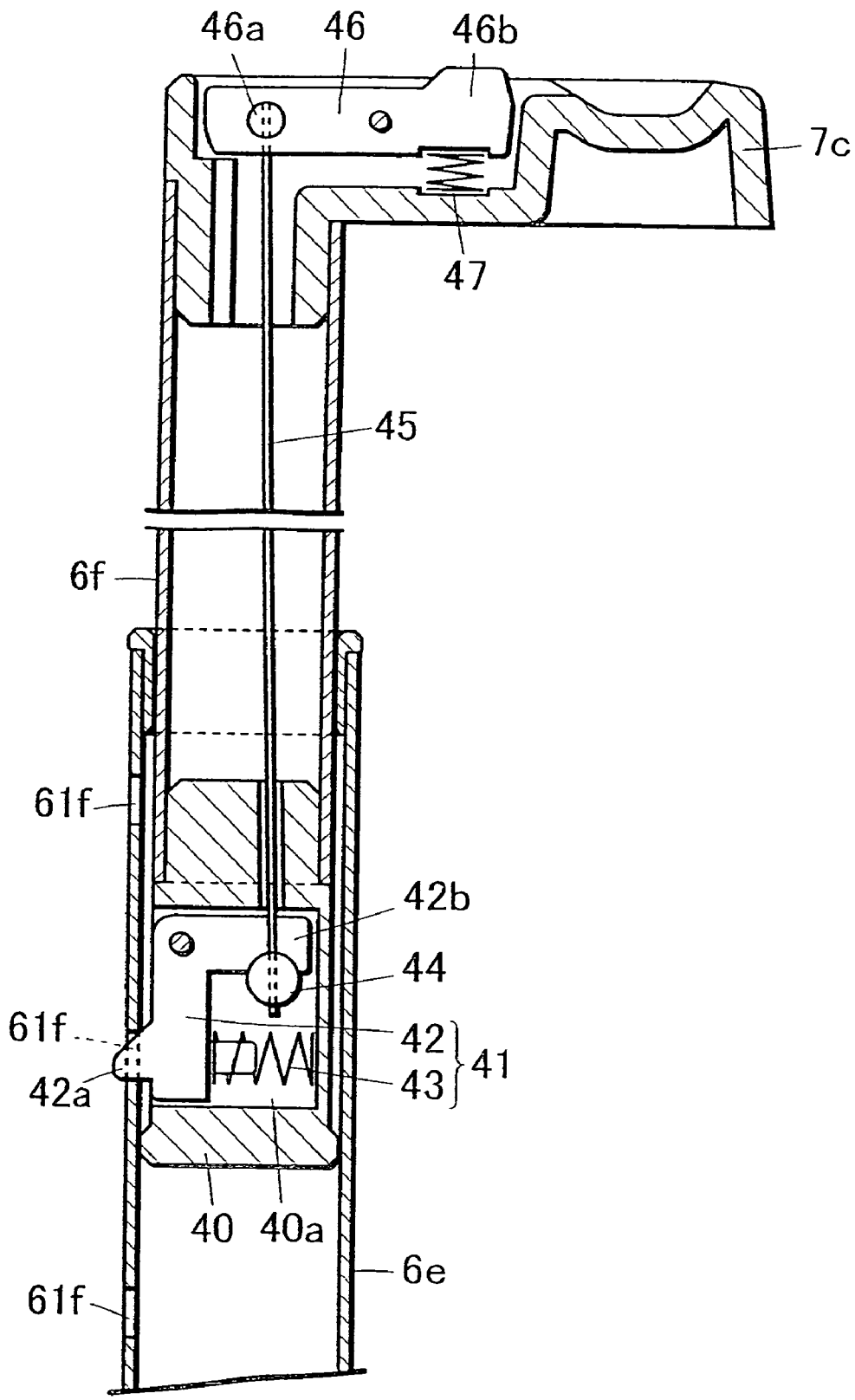
FIG. 21 is a longitudinal sectional view showing a second modified example of the slide locking mechanism shown in FIG. 7.

In addition, FIG. 21 shows a second modified example of the structure of the slide locking mechanism used in the first to third embodiments.

The slide locking mechanism according to the present modified example is composed of a sliding member 40 attached on the inner circumferential face at the rear end of a second pipe 6f and a pipe engaging portion 41 disposed at a concave portion 40a of the sliding member 40, and at least one through hole 61f disposed in a longitudinal direction of the first pipe 6e. The slide locking mechanism according to the present modified example has a pipe engaging support 61f that is engaged with the pipe engaging portion 41 in the extend state and fastens the second pipe 6f. Further, the pipe engaging portion 41 has an engaging member 42 that is pivoted by the sliding member 40 and a spring member 43 that biases the engaging member 42 having one end engaged with the engaging member 42 and the other end engaged with the sliding member 40. Further, the engaging member 42 has a projection portion 42a engaged with the through hole at one end and a coupling portion 42b for coupling a motion transferring portion to move the projection portion 42a from and to the through hole at the other end. The motion transferring portion has a wire 45 that is supported by an engagement releasing portion disposed at the hook portion 7C of the front end of the second pipe 6f and an elevated body 44 hung by the wire 45. The elevated body 44 is engaged with the coupling portion 42b and due to rotation of the engaging member 42 in the axial direction of the column by the elevating motion of the elevated body 44, the projection portion 42a moves back and forward from and to the through hole.

The engagement releasing portion has a control member 46 rotatably pivoted by the hook portion 7C so as to rotate in the axial direction of the column, and a spring member 47 having one end engaged with the control member 46 and the other end engaged with the hook portion 7C. Further, the control member 46 has a supporting portion 46a for supporting the wire 45 and a control portion 46b, and the spring member 47 biases the control portion 46b so as to be separated from the hook portion 7C.

When there is no external force added to the control portion 46b, the projection portion 42a of the engaging member 42 is engaged with the through hole due to bias force of the screen member 43. On the contrary, when the control portion 46b is pressed against the bias force of the spring member 47, the elevated body 44 is elevated, and the projection portion 42a of the engaging member 42 moves back in a direction separated from the through hole against the bias force of the spring member 43 so as to release the engagement with the through hole.

According to the modified example, the column can be easily contracted and extended with the handle fastened on the hook portion and the screen pulled out. In other words, in contracting or extending the column, the pipe at the upper level may be pushed in the pipe at the lower level, or the pipe at the upper level may be pulled out from the pipe at the lower level while pressing the control portion of the engagement releasing portion that is provided at the front end of the column. In the state of pressing the control portion, the projection portion of the engaging member is not engaged with the through hole. Thereby, due to a one time pulling operation or pushing operation, the column can be extended or contracted. In addition, since the engagement releasing portion is provided at the hook portion, the column can be contracted or extended with a one-handed motion while carrying the hook portion.

Figure 22:
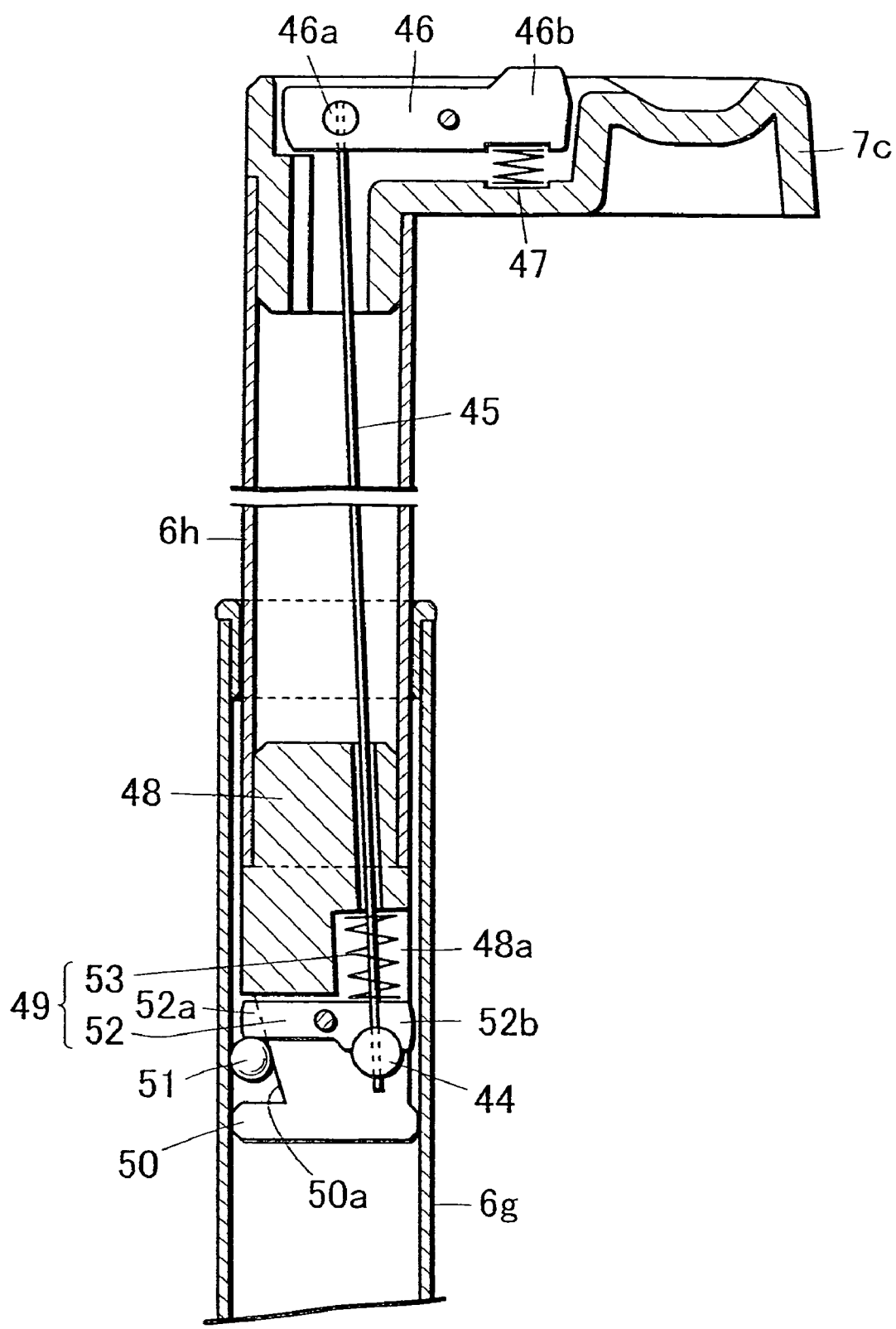
FIG. 22 is a longitudinal sectional view showing a third modified example of the slide locking mechanism shown in FIG. 7.

Further, FIG. 22 shows a third modified example of the slide locking mechanism used in the first to third embodiments. The slide locking mechanism according to the present modified example is different from that used in the first to third embodiments in that an engagement mechanism having no stages is used in place of the tubular engaging portion and the tubular engaging support of the slide locking mechanism shown in FIG. 21.

In other words, the slide locking mechanism according to the present modified example has a sliding member 48 fitted on the inner circumferential face at the rear end of a second pipe 6h, a ball 51 for holding the second pipe 6h at a certain height by abutting it against an inclined portion 50a formed on the outer circumferential face of a lower end 50 of the sliding member 48, and a ball guide portion 49 for guiding the ball 51 to abut against the inclined portion 50a. Further, the ball guide portion 49 has an engaging member 52 that is pivoted by the lower end 50 of the sliding member 48, and a spring member 53 having one end engaged with the concave portion 48a of the sliding member 48 and having the other end engaged with one end of the guide member 52. The engaging member 52 has an engaging portion 52b having the spring member 53 engaged therewith at its one end and a releasing portion 52a for releasing abutting against the inclined portion 50a of the ball 51 by pressing the ball 51 at its other end. The spring member 53 is constantly biased via the engaging portion 52b in a direction that the releasing portion 52a is separated from the ball 51 due to the lever operation.

In addition, the motion transferring portion has the wire 45 that is supported by the engagement releasing portion disposed at the hook portion 7C of the front end of the second pipe 6f and the elevated body 44 hung by the wire 45. The elevated body 44 is engaged with the engaging portion 52b that is used also as a coupling portion. Due to the up and down motion of the elevated body 44, the guide member 52 is rotated in the axial direction of the column causing the releasing portion 52a to press the ball 51, separate from the ball 51, or remain at a mere contacting state. Further, the wire 45 is engaged with the engaging portion 52b through the longitudinal direction of the spring member 53 of the ball guide portion 49.

In this case, the engagement releasing portion has the control member 46 rotatably pivoted by the hook portion 7C capable of rotating in the axial direction of the column, and the spring member 47 having one end engaged with the control member 46 and the other end engaged with the hook portion 7C. Further, the control member 46 has the supporting portion 46a for supporting the wire 45 and the control portion 46b, and the spring member 47 biases the control portion 46b so as to be separated from the hook portion 7C.

In the state that the external force is not added to the control portion 46b, due to the bias force of the spring member 53, the releasing portion 52a is separated from the ball 51 or merely contacts the ball 51, so that the ball 51 abuts against the inclined portion 50a fixing the second pipe 6h. Giving the external force to the control portion 46b and elevating the elevated body 44, the releasing portion 52a presses the ball 51 against the bias force of the spring member 53 to release abutment with the inclined portion 50a. Thereby, it is possible to freely extend the column.

According to the present modified example, as with the second modified example of the slide locking mechanism, the column can be easily extended and contracted by fastening the handle on the hook portion and pulling out the screen. In addition, since the engagement releasing portion is disposed at the hook portion, the column can be extended and contracted by the one-sided operation while carrying the hook portion.

In addition, since the engagement mechanism to abut the ball against the inclined portion is used, without adjusting the height of the column stepwise, the column can be adjusted at an arbitrary height.

Further, drilling to form a through hole for engagement on the column is not needed, and it is possible to provide a screen assembly with a lower cost.

Figure 23:
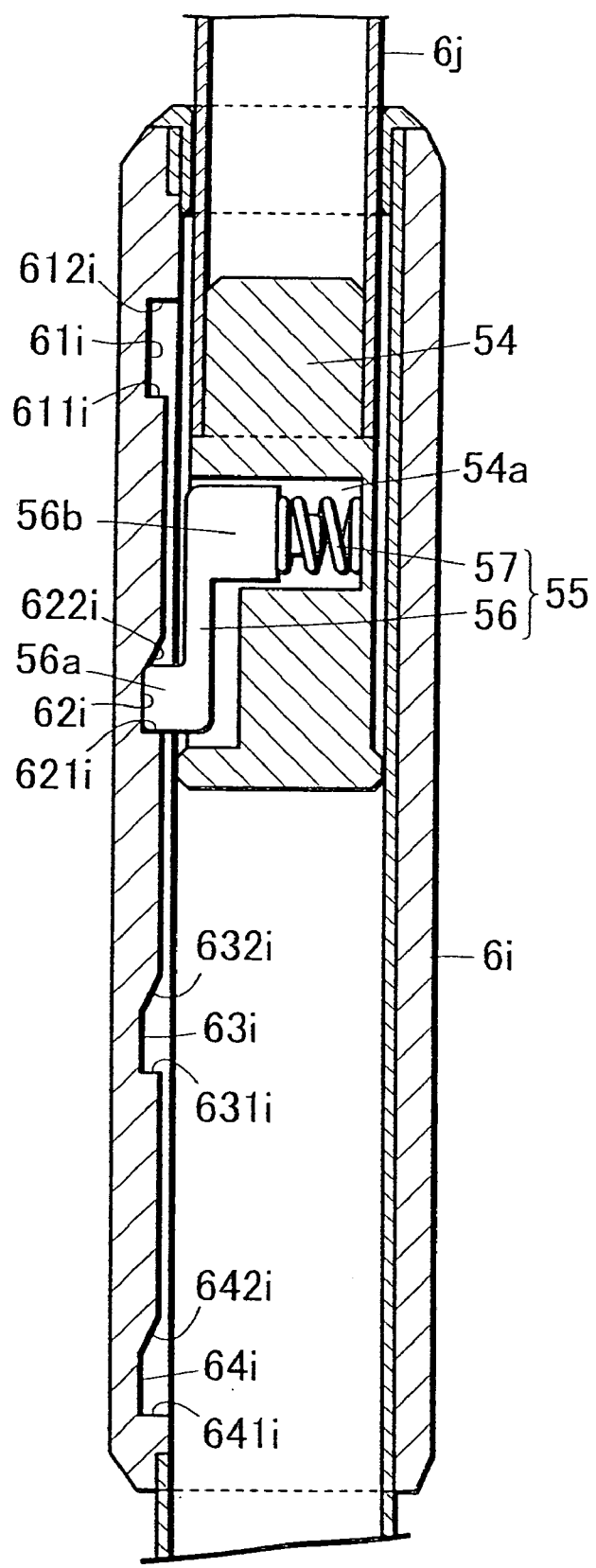
FIG. 23 is a longitudinal sectional view showing a fourth modified example of the slide locking mechanism shown in FIG. 7.
Figure 24:
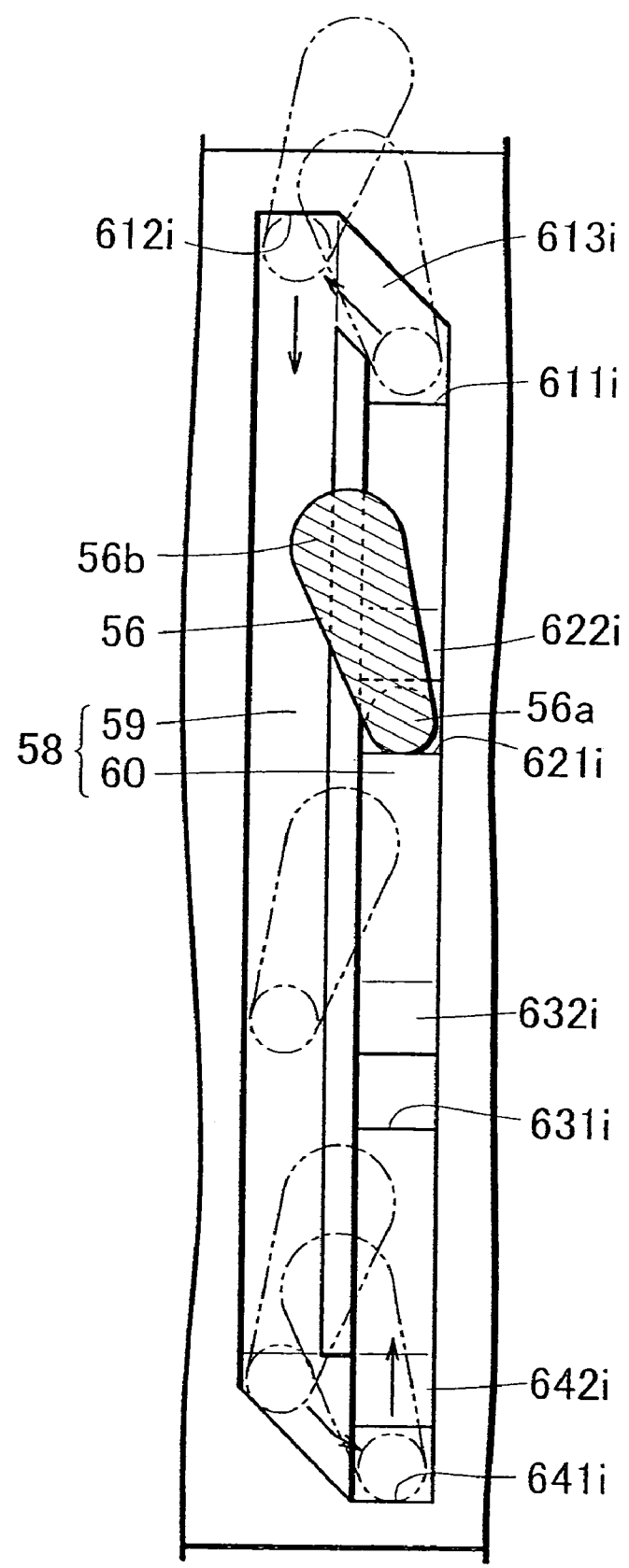
FIG. 24 is a development view showing a peripheral groove used for the forth modified example shown in FIG. 23.

In addition, FIGS. 23 and 24 show a fourth modified example of the slide locking mechanism used in the first to third embodiments.

As shown in FIG. 23, the slide locking mechanism according to the present modified example is composed of a tubular engaging portion 55 that is arranged in a concave portion 54a of a sliding member 54 fitted on the inner circumferential face at the rear end of a second pipe 6j at the front end side, and a tubular engaged portion composed of one continued peripheral groove that is provided in the longitudinal direction of the inner face of a first pipe 6i at the lower level and having engaging portions 61i, 62i, 63i, and 64i. The tubular engaging portion 55 is composed of an engaging member 56 having a supporting portion 56b inserted into the concave portion 54a of the sliding member 54 at its one end and a projection portion 56a engaged with the fastening portion at its other end and capable of being slid using the supporting portion 56b as a support point, and a spring member 57 that has one end engaged with the concave portion 54a of the sliding member 54 and the other end engaged with the supporting portion 56b of the engaging member 56 and biases the projection portion 56a of the engaging member 56 so as to be pressed to the fastening portion.

FIG. 24 is a development view showing the structure of a tubular engaged portion 58. The peripheral groove composing the tubular engaged portion 58 includes an approach root groove 60 having a plurality of fastening portions composed of a concave portion for regulating movement of the second pipe 6j into a contraction direction by being engaged with the projection portion 56a in extension of the column, and a return root groove 59 for allowing movement of the second pipe 6j into the contraction direction releasing the engagement with the projection portion 56a in contraction. The fastening portion has a start point fastening portion 64i, a middle fastening portions 63i and 62i, and an end point fastening portion 61i from the rear end of the first pipe 6i to the front end direction. The start point fastening portion and the middle fastening portion have vertical portions 641i, 631i, and 621i for fastening the projection portion 56a at the rear end side of the first pipe 6i, and inclined portions 642i, 632i, and 622i for allowing the movement of the projection portion 56a to the front end side by being inclined to the front end side. On the other hand, the end point fastening portion at the furthest end has a vertical portion 611i for fastening the projection portion 56a at the rear end side and an ending portion composed of the vertical portion 612i at the front end side. The vertical portion 611i and the vertical portion 612i are connected by an inclined portion 613i inclined to the side of the vertical portion 612i.

When the present screen assembly is not used, the projection portion 56a abuts against the vertical portions 641i of the start point fastening portion 64i, and the second pipe 6j is fixed. When the second pipe 6j is pulled out from the first pipe 6i in this state, the projection portion 56a moves upwards through the inclined portion 642i while sliding the approach root groove 60. Stopping pulling out of the second pipe 6j with the projection portion 56a engaged with the arbitrary fastening portion, the projection portion 56a may abut against the fastening portion, for example, the vertical portion 621i of the middle fastening portion 62i, and the second pipe 6j is fixed. On the other hand, in the case of contracting the column for storage, by pulling out the second pipe 6j to the longest length and moving the projection portion 56a to the end point fastening portion 61i, the projection portion 56a may abut against the end portion 612i to move to the return groove 59 while sliding the inclined portion 613i. In this state, when the second pipe 6j is pushed into the first pipe 6i, the projection portion 56a automatically moves downwards along the return groove 59 to return to the start point fastening portion 64i. Thereby, the column can be made shorter.

According to the present modified example, the column can be easily extended and contracted with the handle fastened to the hook portion and the screen pulled out. Particularly, if the column is extended to the longest length, the column automatically moves downwards, so that the column can be easily contracted.

Figure 25:
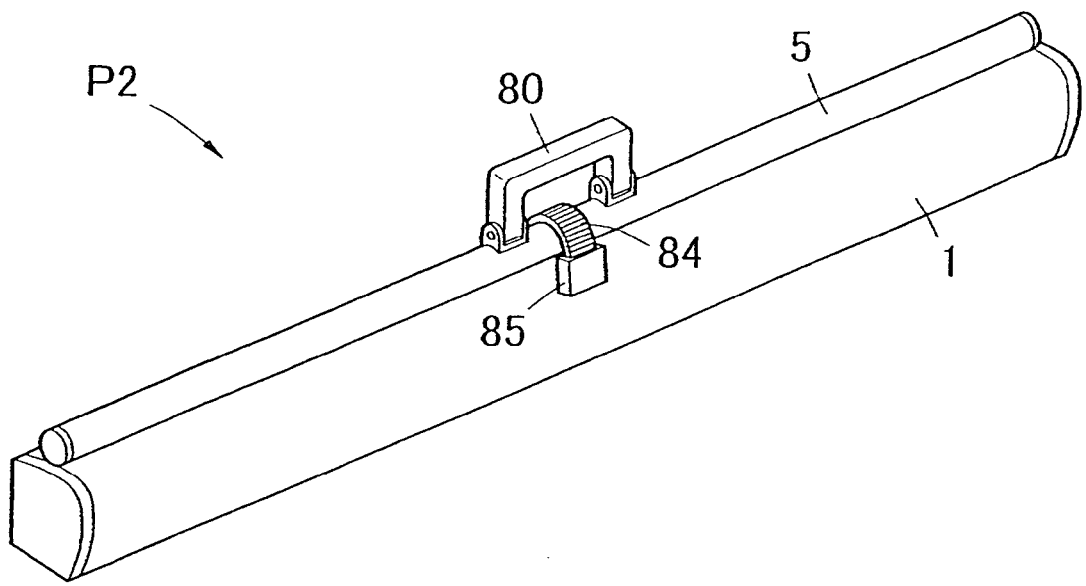
FIG. 25 is a perspective view showing the portable screen assembly having a first modified example of the locking mechanism shown in FIG. 3.
Figure 26:
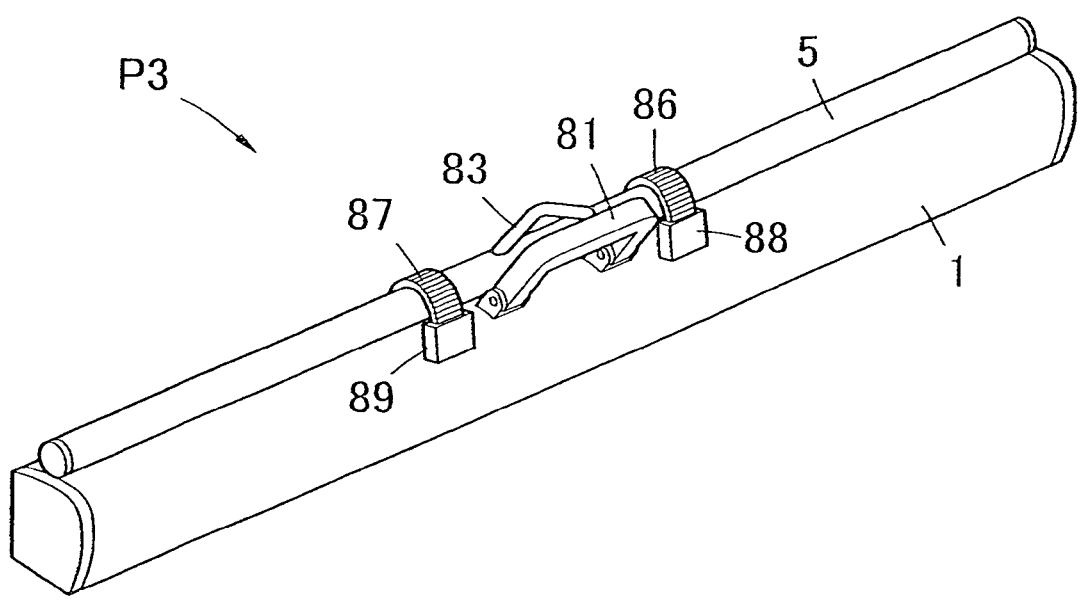
FIG. 26 is a perspective view showing the portable screen assembly having a second modified example of the locking mechanism shown in FIG. 3.
Figure 27:
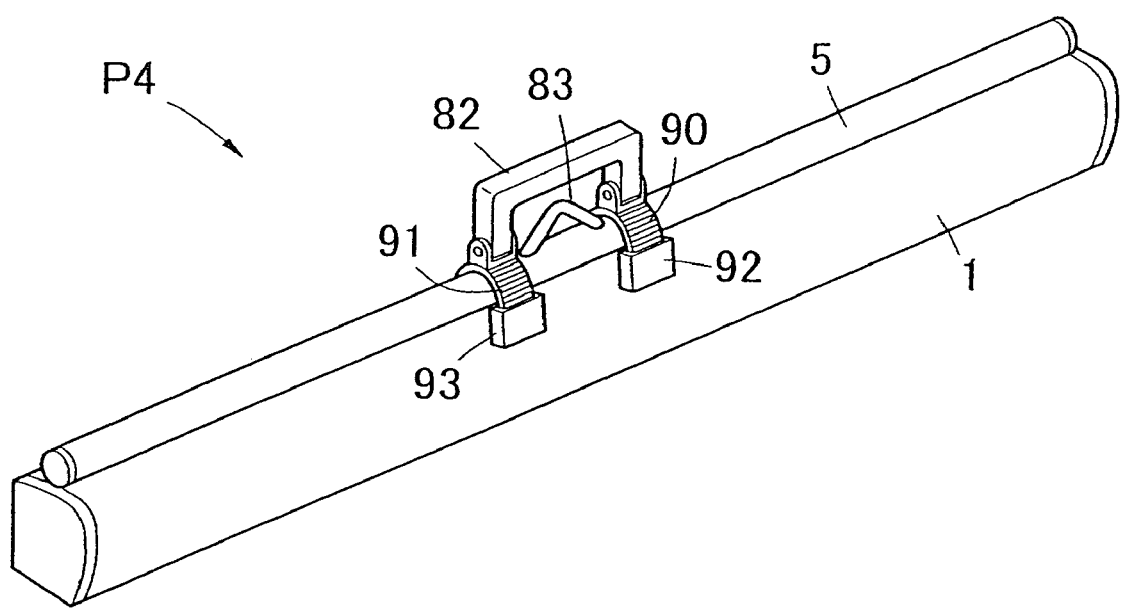
FIG. 27 is a perspective view showing the portable screen assembly having a third modified example of the locking mechanism shown in FIG. 3.

FIGS. 25 to 27 show the modified examples of the locking mechanism used in the first to third embodiments.

FIG. 25 is a perspective view showing the structure of the portable screen assembly P2 having a first modified example of the locking mechanism. The present modified example has a belt member of which one end is firmly fixed to one side face of the casing and of which other end is fixed on the other side face of the casing detachably across the top bar. As shown in FIG. 25, the handle is firmly fixed approximately on the center of the top bar 5, and the free end of a belt member 84 is detachably fixed by the fixing member that is firmly fixed at the side of the casing across the top bar.

According to the present modified example, since the locking mechanism is configured by the simple structure, the screen assembly with a lower cost can be provided.

FIG. 26 shows the other second modified example of the locking mechanism used in the first to third embodiments. According to the present modified example, a pair of belt members is used for the locking mechanism. The present embodiment has a pair of belt members 86 and 87, each of which one end is firmly fixed one side face of the casing 1 and each of which other end is fixed on the other side face of the casing 1 detachably across the top bar 5. The free ends of the belt members 86 and 87 are detachably fixed by fixing members 88 and 89 that are firmly fixed at the side of the casing 1. The handle 81 is located approximately at the center of the casing 1 to be firmly fixed between the fixing members 88 and 89, and a hanging member 83 for fastening is firmly fixed at the center of the top bar 5.

According to the present modified example, the locking mechanism is simply configured and by using a pair of belt members, and it is possible to fix the top bar to the casing more accurately.

FIG. 27 shows another third modified example of the locking mechanism used in the first to third embodiments. According to the present modified example, a pair of belt members formed integrally with the handle is used. The present embodiment has a pair of belt members 90 and 91, each of which one end is firmly fixed one side face of the casing 1 and each of which other end is fixed on the other side face of the casing 1 detachably across the top bar 5. The free ends of the belt members 90 and 91 are detachably fixed by fixing members 92 and 93 that are firmly fixed at the side of the casing 1. The handle 82 is pivoted by a pair of belt members 90 and 91 with the opposite ends being detachable and a hanging member 83 for fastening is firmly fixed at the center of the top bar 5.

According to the present modified example, the locking mechanism is simply configured and by using a pair of belt members, and it is possible to fix the top bar to the casing more certainly.

Further, the first to third embodiments are illustrated by an example that the column made of two or three stages of pipe, however, the number of stages of the pipe is not limited to these examples. For example, when a column with more than three stages is constructed, the slide locking mechanism shown in FIG. 18 or FIG. 20 can be used as the second slide locking mechanism in a pipe at a further front end from the second pipe. In the same way, in a column made of more than four stages, the slide locking mechanism shown in FIG. 18 or FIG. 20 can be used as the second slide locking mechanism for a pipe at the further front slide from the third step. In addition, by using the slide locking mechanism shown in FIG. 18 or FIG. 20 as the all slide locking mechanisms, the column made of many steps of pipe can be also constructed.

The invention claimed is:

1. A portable screen assembly comprising:
 a casing having an opening extending in a longitudinal direction in an upper surface thereof;
 a spring-biased roll rotatably mounted in the casing;
 a screen wound around said spring-biased roll in a storage position, the screen being pulled out from the opening in use;
 a top bar secured to one end of the screen and used also as a cover to close the opening of the casing in the storage position of the screen; and
 an extendable column having one end supported at a center portion of a side face of the casing and holding the pulled out screen in a stretched state,
 wherein a protection member is fitted on a center portion of a front face of the casing so as to reinforce the casing,
 and wherein the column comprises a first slide locking mechanism for fastening a second pipe located at an upper stage of the column on a first pipe located on a lower stage, the first slide locking mechanism comprising: a tubular engaging portion disposed on an inner circumferential face at the rear end of the second pipe; and a tubular engaged portion comprising a plurality of through holes formed in the longitudinal direction of the first pipe and being engaged with the tubular engaging portion,
 and wherein the engagement between the tubular engaging portion and the tubular engaged portion is released by pressing a control portion of an engagement releasing portion that is provided at the front end of the column, and thereby the column can be contracted or extended.

2. The portable screen assembly according to claim 1, wherein the column includes one end erectably pivoted at a center portion of the side of the casing and the column holds the pulled out screen in a stretched state when erected.

3. The portable screen assembly according to claim 1, wherein a handle portion is provided at the center portion of the top bar, and a hook portion is provided at the front end of the column, the handle portion being fastened to the hook portion.

4. The portable screen assembly according to claim 1, wherein the tubular engaging portion comprises an engaging member including a projection portion engaged with a through hole, the engaging member coupling a motion transferring portion to move back and forward the projection portion from and to the through hole, and wherein the engagement between the projection portion and the through hole is released by pressing the engagement releasing portion coupling the motion transferring portion.

5. The portable screen assembly according to claim 1, wherein the column comprises a second slide locking mechanism that locks the slide of a pipe at the front end of the second pipe.

* * * * *